US012771909B2

(12) United States Patent
Chai et al.

(10) Patent No.: US 12,771,909 B2
(45) Date of Patent: Oct. 20, 2026

(54) SYSTEM AND METHOD OF DISPLAYING CONTENT BASED ON LOCATIONAL ACTIVITY

(71) Applicant: OpenTV, Inc., San Francisco, CA (US)

(72) Inventors: Crx Chai, Oakland, CA (US); Alex Fishman, San Francisco, CA (US)

(73) Assignee: OpenTV, Inc., San Francisco, CA (US)

( * ) Notice: Subject to any disclaimer, the term of this patent is extended or adjusted under 35 U.S.C. 154(b) by 113 days.

(21) Appl. No.: 18/892,796

(22) Filed: Sep. 23, 2024

(65) Prior Publication Data

US 2025/0088713 A1 Mar. 13, 2025

Related U.S. Application Data

(63) Continuation of application No. 17/660,269, filed on Apr. 22, 2022, now Pat. No. 12,132,964, which is a continuation of application No. 16/986,495, filed on Aug. 6, 2020, now Pat. No. 11,343,580, which is a continuation of application No. 15/960,929, filed on Apr. 24, 2018, now Pat. No. 10,779,047, which is a continuation of application No. 14/851,227, filed on Sep. 11, 2015, now Pat. No. 9,967,630.

(60) Provisional application No. 62/049,112, filed on Sep. 11, 2014.

(51) Int. Cl.

| | |
|---|---|
| ***H04N 21/4788*** | (2011.01) |
| ***G06F 3/0482*** | (2013.01) |
| ***G06F 3/04842*** | (2022.01) |
| ***G06F 3/0487*** | (2013.01) |
| ***H04N 21/258*** | (2011.01) |
| ***H04N 21/431*** | (2011.01) |
| ***H04N 21/45*** | (2011.01) |
| ***H04N 21/482*** | (2011.01) |

(52) U.S. Cl.

CPC ....... *H04N 21/4788* (2013.01); *G06F 3/0482* (2013.01); *G06F 3/04842* (2013.01); *G06F 3/0487* (2013.01); *H04N 21/25841* (2013.01); *H04N 21/4312* (2013.01); *H04N 21/4524* (2013.01); *H04N 21/4826* (2013.01)

(58) Field of Classification Search

CPC ......... H04N 21/4788; H04N 21/25841; H04N 21/4312; H04N 21/4524; H04N 21/4826; G06F 3/0482; G06F 3/04842; G06F 3/0487

See application file for complete search history.

(56) References Cited

U.S. PATENT DOCUMENTS

2009/0287790 A1* 11/2009 Upton ................ H04L 12/1827 709/208
2012/0110621 A1* 5/2012 Gossweiler, III ...... G06Q 50/01 725/46
2012/0293600 A1* 11/2012 Lemmey ............ H04L 12/1827 348/14.03

(Continued)

*Primary Examiner* — Chenea Davis

(74) *Attorney, Agent, or Firm* — Maier & Maier, PLLC

(57) ABSTRACT

A device for enabling content selection is configured to display a graphical user interface including a map and information associated with other users. The map may including identifiers of users at respective locations. The device may enable a user to navigate to a particular identifier. The device may be configured to display a window including an item of content associated with a particular identifier. The device may be configured to facilitate a video chat between one or more users.

15 Claims, 20 Drawing Sheets

(56) References Cited

U.S. PATENT DOCUMENTS

| | | | | |
|---|---|---|---|---|
| 2013/0133005 | A1* | 5/2013 | Sakai | H04N 5/4403 725/46 |
| 2015/0033253 | A1* | 1/2015 | Yoshioka | H04N 5/44591 725/32 |

* cited by examiner

SYSTEM AND METHOD OF DISPLAYING CONTENT BASED ON LOCATIONAL ACTIVITY

RELATED APPLICATIONS

This application is a continuation of U.S. patent application Ser. No. 17/660,269, filed on Apr. 22, 2022, which is a continuation of U.S. patent application Ser. No. 16/986,495, filed on Aug. 6, 2020, which is a continuation of U.S. patent application Ser. No. 15/960,929, filed on Apr. 24, 2018, which is a continuation of U.S. patent application Ser. No. 14/851,227, filed on Sep. 11, 2015, which claims the benefit of priority to U.S. Provisional Application Ser. No. 62/049,112, filed on Sep. 11, 2014, which applications are incorporated by reference in their entireties.

TECHNICAL FIELD

The present disclosure relates to the field of interactive television and graphical user interfaces.

BACKGROUND

Digital media playback capabilities may be incorporated into a wide range of devices, including digital televisions, including so-called "smart" televisions, laptop or desktop computers, tablet computers, e-book readers, personal digital assistants (PDAs), digital recording devices, digital media players, video gaming devices, digital cameras, cellular or satellite radio telephones, including so-called "smart" phones, dedicated video streaming devices, and the like. Digital media content may originate from a plurality of sources including, for example, over-the-air television providers, satellite television providers, cable television providers, online media-sharing services, online media streaming services, peer devices, and the like.

Due to the wide range of content users may access on their televisions and secondary connected devices, traditional techniques for the organizing, sorting, and displaying available content choices may be less than ideal. For example, the presentation of content within a traditional digital cable television system has typically been displayed and organized with static sorting methods. That is, there are typically no indications made to the user of the global popularity of each piece of content.

SUMMARY

The following brief summary is not intended to include all features and aspects of the present invention, nor does it imply that the invention must include all features and aspects discussed in this summary. The present disclosure relates to the field of graphical user interfaces and more specifically describes techniques for presenting a user with a dynamic interactive graphics experience. In particular, this disclosure describes techniques for navigating and displaying content based on locational activity. In some examples, the techniques may be implemented in a device with digital media playback capabilities, including for example, set top boxes and televisions.

According to one example of the disclosure, a method for enabling content selection comprises displaying a graphical user interface including a map including identifiers of users at respective locations, enabling a user to navigate to a particular identifier, and upon a user navigating to a particular identifier displaying a window associated with an item of content.

According to another example of the disclosure, a device for enabling content selection comprises one or more processors configured to display a graphical user interface including a map including identifiers of users at respective locations, enable a user to navigate to a particular identifier, and upon a user navigating to a particular identifier, displaying a window associated with an item of content.

According to another example of the disclosure, an apparatus for enabling content selection comprises means for displaying a graphical user interface including a map including identifiers of users at respective locations, means for enabling a user to navigate to a particular identifier, and means for upon a user navigating to a particular identifier, displaying a window associated with an item of content.

According to another example of the disclosure a non-transitory computer-readable storage medium has instructions stored thereon that upon execution cause one or more processors of a device to display a graphical user interface including a map including identifiers of users at respective locations, enable a user to navigate to a particular identifier, and upon a user navigating to a particular identifier displaying a window associated with an item of content.

The details of one or more examples are set forth in the accompanying drawings and the description below. Other features, objects, and advantages will be apparent from the description and drawings, and from the claims.

DETAILED DESCRIPTION

Figure 1:
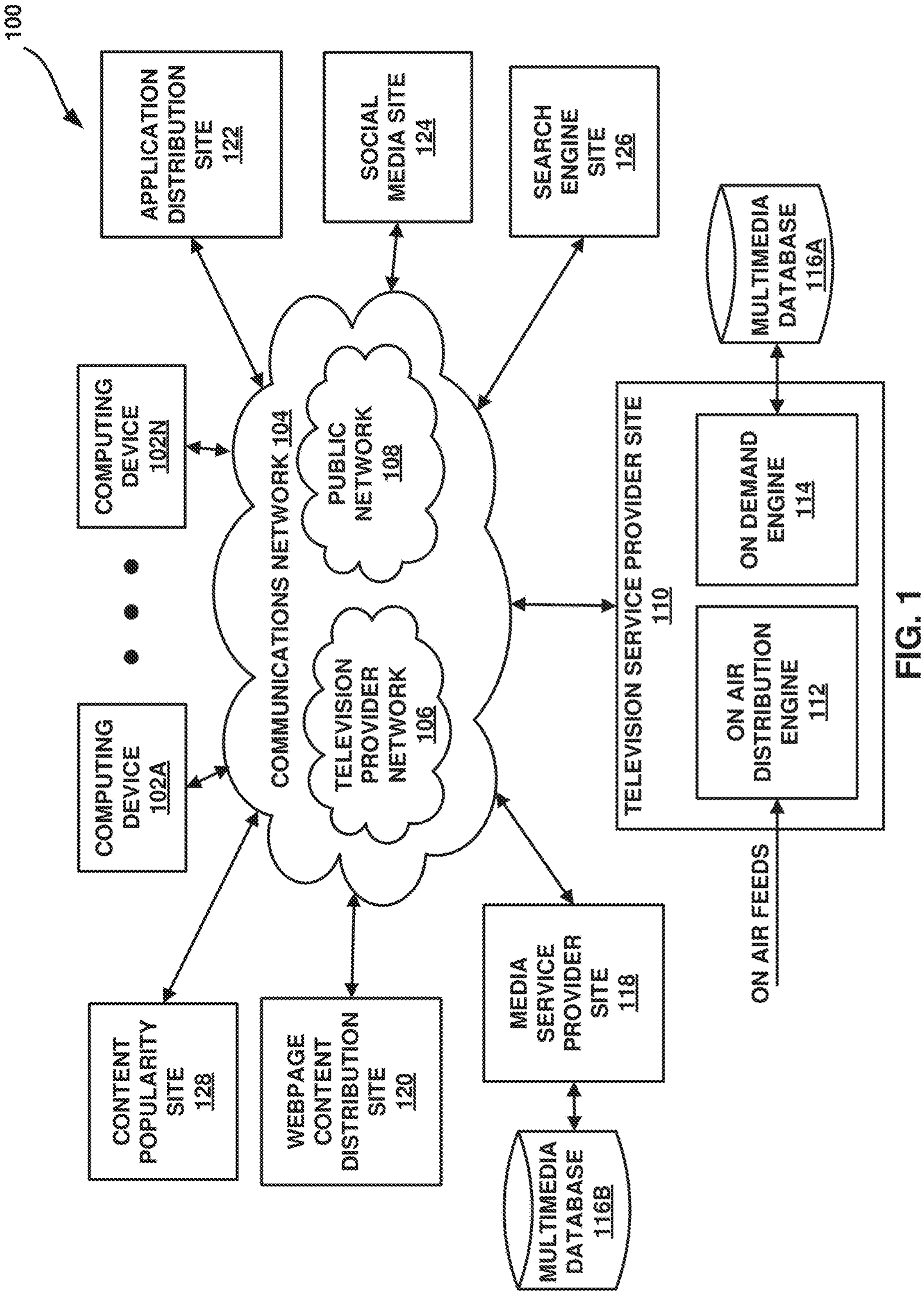
FIG. 1 is block diagram illustrating an example of a system that may implement one or more techniques described in this disclosure.

Devices with digital media playback capabilities, including televisions, set top boxes, and mobile devices, may be configured to provide users thereof with graphical user interfaces that enable the selection of content, including content originating from one or more of over-the-air television providers, satellite television providers, cable television providers, online media-sharing services, and online media streaming services. In some examples, these graphical user interfaces may be referred to as electronic program guides (EPGs). Traditional electronic program guides typically display and organize content according to static sorting methods. For example, traditional electronic program guides may simply list available on demand movies alphabetically. Traditional electronic programming guides may provide no indication of the global popularity of content and do not provide a user with any indication of locational activity. According to examples techniques described herein, the selection of content may be facilitated and the viewing of content may be enhanced by incorporating indications of regional popularity and/or locational activity within a graphical user interface.

One instance where providing regional popularity may be particularly useful is in the case where the majority of the members of a user's social circle are located in a different region than a user. For example, a user may have recently moved away to attend college or relocated for a job. In this instance, the user may wish to select multimedia content based on what members of a user's social circle are accessing. In one example, the systems and techniques described herein may enable a user to engage in a viewing party with the user's friends (where friends may be defined according to one or more social networks, or the like). It should be noted that in one example, a user and a user's friends may have different television service providers. For example, a user in the United States may receive television services from a regional cable provider and a user's friend located in Europe may receive television services from a satellite television service provider. In this example, each of the user and the user's friend may have set-top boxes supporting the applications described herein. Further, a central server may coordinate communication between the applications, e.g., content popularity site 128 described below. For example, an application implemented on the user's set top box may upload user viewing data to a central server and a respective application on a user's friend's set top box may download the user's viewing information from the central server.

Described herein are systems and methods for presenting content to a user based at least in part on regional popularity and/or locational activity. Some embodiments extend to a machine-readable medium embodying instructions which, when executed by a machine, cause the machine to perform any one or more of the methodologies described herein. Other features will be apparent from the accompanying drawings and from the detailed description that follows. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

FIG. 1 is block diagram illustrating an example of a system that may implement one or more techniques described in this disclosure. System 100 may be configured to enable content selection in accordance with the techniques described herein. In the example illustrated in FIG. 1, system 100 includes one or more computing devices 102A-102N, communications network 104, television service provider site 110, media service provider site 118, webpage content distribution site 120, application distribution site 122, social media site 124, search engine site 126, and content popularity site 128. System 100 may include software modules operating on one or more servers. Software modules may be stored in a memory and executed a processor. Servers may include one or more processors and a plurality of internal and/or external memory devices. Examples of memory devices include file servers, file transfer protocol (FTP) servers, network attached storage (NAS) devices, local disk drives, or any other type of device or storage medium capable of storing data. Storage medium may include Blu-ray discs, DVDs, CD-ROMs, flash memory, or any other suitable digital storage media. When the techniques described herein are implemented partially in software, a device may store instructions for the software in a suitable, non-transitory computer-readable medium and execute the instructions in hardware using one or more processors.

System 100 represents an example of a system that may be configured to allow digital content, such as, for example, music, videos, images, webpages, messages, voice communications, and applications, to be distributed to and accessed by a plurality of computing devices, such as computing devices 102A-102N. In the example illustrated in FIG. 1, computing devices 102A-102N may include any device configured to transmit data to and/or receive data from communication network 104. For example, computing devices 102A-102N may be equipped for wired and/or wireless communications and may include set top boxes, digital video recorders, televisions, desktop, laptop, or tablet computers, gaming consoles, mobile devices, including, for example, "smart" phones, cellular telephones, and personal gaming devices. It should be noted that although example system 100 is illustrated as having distinct sites, such an illustration is for descriptive purposes and does not limit system 100 to a particular physical architecture. Functions of system 100 and sites included therein may be realized using any combination of hardware, firmware and/or software implementations.

Communications network 104 may comprise any combination of wireless and/or wired communication media. Communications network 104 may include coaxial cables, fiber optic cables, twisted pair cables, wireless transmitters and receivers, routers, switches, repeaters, base stations, or any other equipment that may be useful to facilitate communications between various devices and sites. Communications network 104 may operate according to a combination of one or more telecommunication protocols. Telecommunications protocols may include proprietary aspects and/or may include standardized telecommunication protocols. Examples of standardized telecommunications protocols include Digital Video Broadcasting (DVB) standards, Advanced Television Systems Committee (ATSC) standards, Integrated Services Digital Broadcasting (ISDB) standards, Data Over Cable Service Interface Specification (DOCSIS) standards, Global System Mobile Communications (GSM) standards, code division multiple access (CDMA) standards, 3rd Generation Partnership Project (3GPP) standards, European Telecommunications Standards Institute (ETSI) standards, Internet Protocol (IP) standards, Wireless Application Protocol (WAP) standards, and IEEE standards, such as, for example, one or more of the 802 standards.

As illustrated in FIG. 1, networks of different types may be defined within communications network 104. Networks may be defined according physical and/or logical aspects. For example, networks that share the same physical infrastructure (e.g., coaxial cables) may be distinguished based on a primary service type (e.g., webpage access or television service). Physical and logical aspects of networks may be described according to a layered model. For example, layers of a model may respectively define physical signaling, addressing, channel access control, packet properties, and data processing in a communications system. One example of a layered model is the Open Systems Interconnection (OSI) model. In the example illustrated in FIG. 1, communications network 104 includes television provider network 106 and public network 108. It should be noted that although television provider network 106 and public network 108 are illustrated as distinct, television provider network 106 and public network 108 may share physical and/or logical aspects.

Television provider network 106 is an example of a network configured to provide a user with television services. For example, television provider network 106 may include public over-the-air television networks, public or subscription-based satellite television service provider networks, and public or subscription based cable television provider networks. It should be noted that although in some examples television provider network 106 may primarily be used to provide television services, television provider network 106 may also provide other types of data and services according to any combination of the telecommunication protocols described herein.

Public network 108 is an example of a packet-based network, such as, a local area network, a wide-area network, or a global network, such as the Internet, configured to provide a user with World Wide Web based services. Public network 108 may be configured to operate according to Internet Protocol (IP) standards. It should be noted that although in some examples public network 108 may primarily be used to provide access to hypertext web pages, public network 108 may also provide other types of media content according to any combination of the telecommunication protocol described herein.

Referring again to FIG. 1, television service provider 110 represents an example of a television service provider site. Television service provider 110 may be configured to provide computing devices 102A-102N with television service. For example, television service provider 110 may be a public broadcast station, a cable television provider, or a satellite television provider and may be configured to provide television services to analog and/or digital televisions and set top boxes. In the example illustrated in FIG. 1, television service provider 110 includes on air distribution engine 112 and on demand engine 114. On air distribution engine 112 may be configured to receive a plurality of on air feeds and distribute the feeds to computing devices 102A-102N through television provider network 106. For example, on air distribution engine 112 may be configured to receive one or more over-the-air television broadcasts via a satellite uplink/downlink and distribute the over-the-air television broadcasts to one or more users of a subscription-based cable television service.

On demand engine 114 may be configured to access a multimedia library and distribute multimedia content to one or more of computing devices 102A-102N through television provider network 106. For example, on demand engine 114 may access multimedia content (e.g., music, movies, and TV shows) stored in multimedia database 116A and provide a subscriber of a cable television service with movies on a Pay Per View (PPV) basis. Multimedia database 116A may be a storage device configured to store multimedia content. It should be noted that multimedia content accessed through on demand engine 114 may also be located at various sites within system 100 (e.g., peer-to-peer distribution). In one example, on demand engine 114 may be configured to generate usage data associated with available content. For example, on demand engine 114 may track the number of times available items of content are requested by users during a particular time period. For example, on demand engine 114 may track the number of times a particular movie was requested during the past 24 hours.

Further, on demand engine 114 may be configured to track the number of times a particular item of content was requested by a subset of users of computing devices 102A-102N. For example, on demand engine 114 may be configured to track the number of times a particular movie was requested by users within a particular metropolitan area. In one example, television service provider site 110 may be configured such that users are able to define subsets of users. For example, television service provider site 110 may be configured such that a user is able to include his or her colleagues in one or more subsets. For example, a user may be able to include close acquaintances in a first subset and casual acquaintances in a second subset. As described in detail below, content popularity site 128 may generate an on demand requests value based on the number of times an item of content was requested by one or more subsets users of television service provider site during a particular time period.

Media service provider site 118 represents an example of a multimedia service provider. Media service provider site 118 may be configured to access a multimedia library and distribute multimedia content to one or more of computing devices 102A-102N through public network 108. For example, media service provider site 118 may access multimedia (e.g., music, movies, and TV shows) stored in multimedia database 116B and provide a user of a media service with multimedia. Multimedia database 116B may be a storage device configured to store multimedia content. In one example, media service provider site 118 may be configured to provide content to one or more of computing devices 102A-102N using the Internet protocol suite. In some examples, a media service may be referred to as a streaming service. Commercial examples of media services may include Hulu®, YouTube®, Netflix®, and Amazon Prime®.

As described above, television provider network 106 and public network 108 may share physical and logical aspects. Thus, content accessed by one or more of computing devices 102A-102N through media service provider site 118 may be transmitted through physical components of television provider network 106. For example, a user of a computing device may access the internet and multimedia content provided by a media service through a cable modem connected to a coaxial network maintained by a cable television provider. In some examples, media service provider site 118 may be configured to generate usage data associated with available content. For example, media service provider site 118 may track the number of times available items of content are requested by users during a particular time period.

In a manner similar to that described above with respect to on demand engine 114, media service provider site 118 may be configured to track the number of times a particular item of content was requested by a subset of users of computing devices 102A-102N. In one example, media service provider site 118 may be configured such that users are able to define subsets of users. As described in detail below, content popularity site 128 may generate a media service requests value based on the number of times an item of content was requested by one or more subsets users of media service provider site 118 during a particular time period.

Webpage content distribution site 120 represents an example of a webpage service provider. Webpage content distribution site 120 may be configured to provide hypertext based content to one or more of computing devices 102A-102N through public network 108. It should be noted that hypertext based content may include audio and video content. Hypertext content may be defined according to programming languages, such as, for example, Hypertext Markup Language (HTML), Dynamic HTML, and Extensible Markup Language (XML). Examples of webpage content distribution sites include the Wikipedia website and the United States Patent and Trademark Office website. Webpage content may also include webpages providing usage data associated with particular items of content. For example, webpage content may include a movie review website where a number of users are able to provide comments with respect to particular movies. In one example, webpage content may include a list of top 50 movie rentals during a particular period. For example, the Home Media Magazine website provides a list of the top movie rentals during a weekly period. As described in detail below content popularity site 128 may generate a rentals value based the ranking of an item of content in a top movie rental list during a particular time period.

Application distribution site 122 represents an example of an application distribution service. Application distribution site 122 may be configured to distribute developed software applications to one or more of computing devices 102A-102N. In one example, software applications may include games and programs operable on computing devices. In other examples, software applications may be configured to allow a computing device to access content provided by a site in manner specific to the computing device. For example, software applications may be configured to provide enhanced or reduced functionality of a webpage to a mobile device or a set top box. Software applications may be developed using a specified programming language. Examples of programming languages include, Java™, Jini™, C, C++, Perl, UNIX Shell®, Visual Basic®, and Visual Basic® Script. In some examples, developers may write software applications using a software development kit (SDK) provided by a device manufacturer or a service provider.

In the example where one or more of computing devices 102A-102N are mobile devices, application distribution site 122 may be maintained by a mobile device manufacturer, a service provider, and/or a mobile device operating system provider. In the example where one or more of computing devices 102A-102N are set top boxes, application distribution site 108 may be maintained by a set top box manufacturer, a service provider, and/or an operating system provider. In some examples, an application distribution site may be referred to as an app store. Examples of commercially available application distribution sites include sites maintained by Google®, Inc., Apple®, Inc., BlackBerry®, Inc., Microsoft®, Inc., and Amazon.com®, Inc.

Social media site 124 represents an example of a social media service. Social media site 124 may be configured to allow users of computing devices 102A-102N to communicate with one another. Social media site 124 may be configured to host profile pages corresponding to users of computing devices 102A-102N. For example, social media site 124 may be configured such that users of computing devices 102A-102N are able to display messages and upload photos, videos, and other media to a user's profile page. Further, social media site 124 may be configured to enable users of computing devices 102A-102N to comment on particular items of content. For example, users of computing devices 102A-102N may be able to endorse a television show or a movie. Examples of commercially available social media sites include Facebook®, YouTube®, Linkedin®, Google Plus®, Twitter®, Flickr®, and Instagram®.

In addition to allowing users to maintain profile pages, social media site 124 may be configured to generate usage data based on information included in user profile pages and/or user activity. For example, social media site 124 may be configured to track the popularity of a movie or television show based on comments provided by users of computing devices 102A-102N. As described in detail below, the techniques described herein may allow users of computing devices 102A-102N to incorporate functions of social media sites to share content and recommendations with other users. For example, users may chat and interact with one another during the playback of content. Further, content may be presented to a user based on whether content was endorsed by one or more other users.

In one example, social media site 124 may include Facebook® and the popularity of a particular item of content may be based on a number of "likes" and/or the number of users "talking about" a particular piece of content during a particular time period. In one example, social media site 124 may include Twitter® and the popularity of a particular item of content may be based on the number of tweets including an identifier associated with a particular item of content during a particular time period. It should be noted that in some examples, an indicator of social media popularity may be based on data provided by a social media aggregation service. An example of a commercially available social media aggregation service includes Twitter Counter. As described in detail below content popularity site 128 may generate a social media value based social media activity associated with an item of content.

Search engine site 126 represents an example of a content search service. Search engine site 126 may be a service configured to allow users of computing devices 102A-102N to search for content available through communications network 104. Search engine site 126 may be configured to receive queries from computing devices 102A-102N and provide a list of search results to computing devices 102A-102N. For example, search engine site 126 may be configured such that users of computing devices 102A-102N are presented with a webpage including a search query field and are able to search content based on keywords. Examples of commercially available search engine sites include Google®, Bing®, and Yahoo!®. Further, search engine site 126 may be configured to generate usage data based on information included in search queries. For example, search engine site 126 may be configured to track the popularity of a movie and/or television show based on the number of times a query related to the movie and/or television is provided by users of computing devices 102A-102N. For example, a search query with respect to a particular actress may generate usage data for one or more items of content associated with the actress. In one example, search engine site 126 may provide a list of the top search requests during a particular period. As described in detail below content popularity site 128 may generate a search requests value based on the ranking of an item of content in a top search request list during a particular time period.

As described above, on demand engine 114 and media service provider site 118 may generate usage data associated with available content based on the number of times content is accessed. As further described above, webpage content distribution site 120, social media site 124, and search engine site 126 may generate usage data associated with available content based on additional user activity. Content popularity site 128 represents an example of a site configured to receive a list of available content and usage data associated with available content and determine the popularity of items of content. Further, as described above, content popularity site 128 may receive viewing data from an application running on a computing device 102A-102N (e.g., an application implemented on the user's set top box may upload user viewing data to content popularity site 128). It should be noted that although content popularity site 128 is illustrated in FIG. 1 as a distinct site, in some examples, content popularity site 128 may be included as part of television service provider site 110. Further, in some examples, one or more functions described with respect to content popularity site 128 may be performed by computing devices 102A-102N.

In one example, content popularity site 128 may generate a list of content available to one or more of computing devices 102A-102N by receiving a list of all available or viewable content from television service provider site 110 and/or media service provider site 118. Content popularity site 128 may receive usage data from one or more of the sources described above. That is, content popularity site 128 may be configured to receive multiple types of usage data from multiple sources and generate a popularity value for a particular piece of content. In one example, after generating a list of available content, content popularity site 128 may poll specified social media sites, webpage content distribution sites, and/or search engine sites for usage data with respect to available content. In one example, the usage data may be comprised of any text, image, audio or video associated with an item of content and may be stored on content popularity site 128.

Content popularity site 128 may aggregate usage data and correlate usage data to each piece of content in a list of available or viewable content. In one example, content popularity site 128 calculates a popularity ranking for items of content based on the aggregated data. In one example, the popular ranking may be a numeric value. In one example, the numeric value indicating the popularity ranking may be referred to as a "buzz factor." In one example, a popularity ranking may be calculated based on the number of endorsements an item of content has received on various social networks and websites. It should be noted that each social network or website may have differing types of usage data and may measure usage using different metrics. As such, content popularity site 128 may be configured to run an algorithm to determine relevant endorsements and filter out extraneous usage data.

In one example, an algorithm may include a weighted sum where a scaling factor is applied to each source of data. Each scaling factor may be based on a particular user's level of activity with a social media site, search engine, and/or a webpage content distribution site. For example, content popularity site 128 may determine that a user accesses a particular movie review site on a regular basis and does not access a particular social media site on a regular basis. Thus, content popularity site 128 may be configured to apply a higher scaling factor for the particular movie review site than the particular social media site (i.e., give the movie review site more importance when determining popularity). In one another example, content popularity site 128 may select a scaling factor for sources of usage data based on the proximity of an endorsement to a user. That is, endorsements from users of a social media service that are more closely connected to a user (e.g., within an immediate list of contacts versus a general user of a social media site) may be associated with a higher scaling factor.

In one example, a user of a computing device may be able to set scaling factors directly or indirectly based on personal preferences. For example, a user may be able to select the sources from which usage data is aggregated and/or how scaling factors are determined. For example, a user may be able to specific that content popularity site 128 only use immediate contacts of a user for particular social media service when determining a ranking. Content popularity site 128 may be configured to store preference information provided by a user and generate a numeric value indicating popularity based on user preferences.

In one example, content popularity site 128 may generate one or more of the following values for use in a weighted sum to determine a buzz factor: on demand requests value, media service requests value, rentals value, social media value, and search requests value, where on demand requests value is based on usage data from on air distribution engine 112, where media service requests value is based on usage data from media service provider site 118, where rentals value is based on the ranking of an item of content in a top movie rental list during a particular time period, where social media value is based on social media activity associated with an item of content from social medial site 124, and where search requests value is based on the ranking of an item of content in a top search request list during a particular time period from search engine site 126. In one example, each of the values may be normalized to a common range (e.g., 1 to 50). For example, 10,000 endorsements for a particular an item content may be normalized to be equivalent to 100 requests for the particular item of content. Further, in one example, scaling factors based on a user's level of activity and/or personal preferences may be an integer from zero to five. In this manner, in this example, a buzz factor may range from 0 to 1250 (i.e., 5(50)+5(50)+5(50)+5(50)+5(50)).

As described in detail below, the presentation of available content within a graphical user interface may be based on a buzz factor. Thus, an algorithm used to determine a buzz factor and the frequency at which a buzz factor is updated may be selected such that the presentation of available content within a graphical user interface varies in a manner that will make a user more or less likely to select a particular item of content. For example, a buzz factor and the frequency at which a buzz factor is updated may be selected such that in a typical case, a buzz factor has a variance of 25% during a ten second interval.

In one example, content popularity site 128 may provide ranking values to one or more of computing devices 102A-102N, media service provider site 118, and/or television service provider site 110. In one example, content popularity site 128 may return a popularity value to a computing device upon receive a request from a computing device. In one example, content popularity site 128 may collect and aggregate the usage data in real time and push data updates to a computing device. As described in detail below, computing devices 102A-102N may be configured to display and/or sort available content based on popularity rankings. Further, computing devices 102A-102N may be configured to display and/sort content by individual user endorsements. In one example, a computing device may display actual social data in chronological order along with the real time content and social media updates. In one example, content popularity site 128 may facilitate communicate between applications (e.g., globe content navigational applications and viewing party applications described with respect to FIGS.

3A-7) operating on computing devices associated with different television service providers.

Figure 2A:
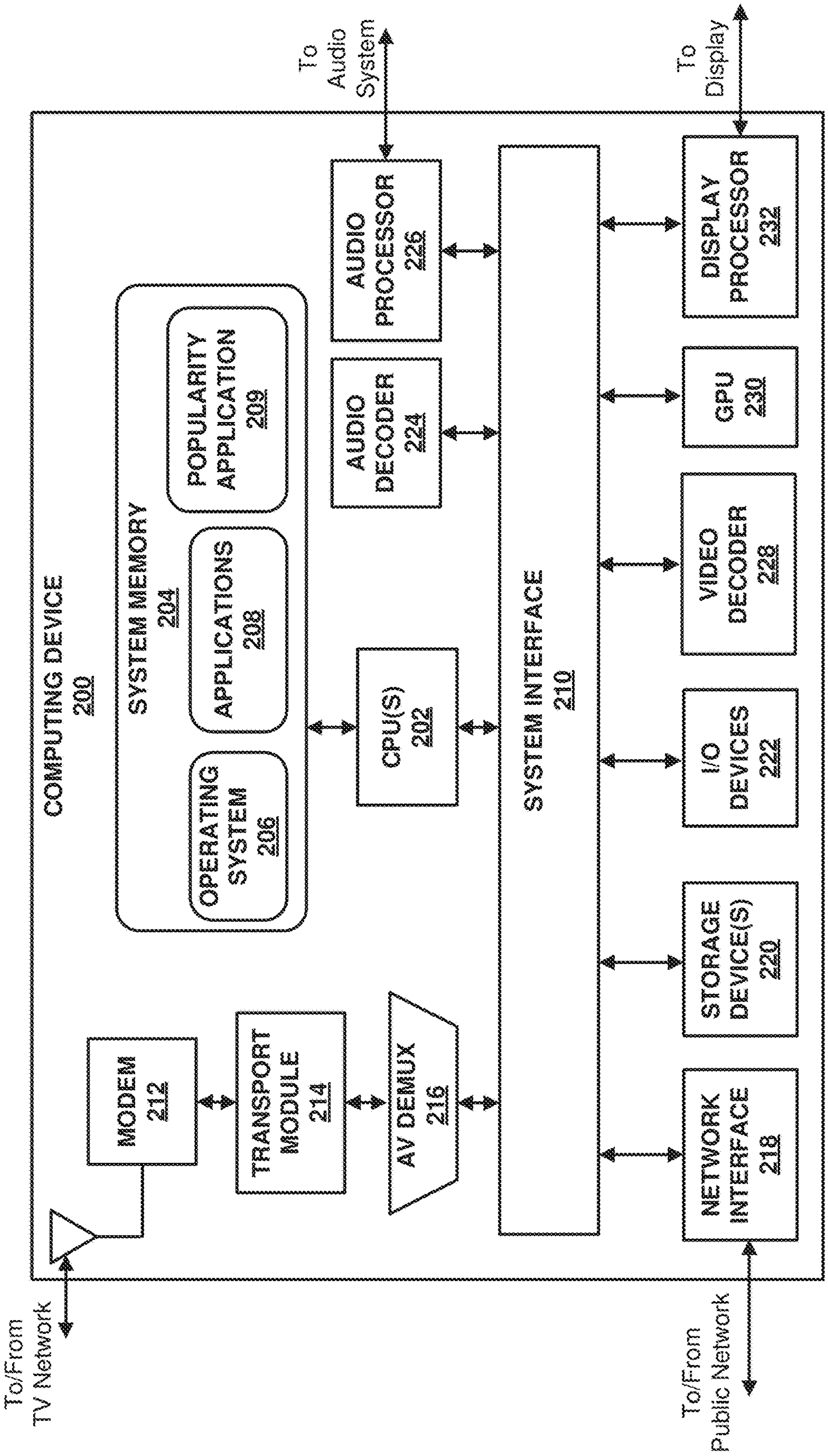
FIG. 2A is a block diagram illustrating an example of a computing device that may implement one or more techniques of this disclosure.

FIG. 2A is a block diagram illustrating an example of a computing device that may implement one or more techniques of this disclosure. Computing device 200 is an example of a computing device that may be configured to transmit data to and receive data from a communications network, allow a user to access multimedia content, and execute one or more applications. Computing device 200 may include or be part of a stationary computing device (e.g., a desktop computer, a television, a set-top box, a gaming console, a dedicated multimedia streaming device, or a digital video recorder), a portable computing device (e.g., a mobile phone, a laptop, a personal digital assistant (PDA), or a tablet device) or may be or included as part of another computing device. In the example illustrated in FIG. 2A, computing device 200 is configured to send and receive data via a television network, such as, for example, television network 106 described above and send and receive data via a public network, such as, for example, public network 108. It should be noted that in other examples, computing device 200 may be configured to send and receive data through one of a television network 106 or a public network 108. The techniques described herein may be utilized by devices configured to communicate using any and all combinations of communications networks.

As illustrated in FIG. 2A, computing device 200 includes central processing unit(s) (CPUs) 202, system memory 204, system interface 210, modem 212, transport module 214, AV demux 216, network interface 218, storage device(s) 220, input/output (I/O) device(s) 222, audio decoder 224, audio processor 226, video decoder 228, graphics processing unit 230, and display processor 232. As illustrated in FIG. 2A, system memory 204 includes operating system 206, applications 208, and popularity application 209. Each of central processor unit(s) 202, system memory 204, system interface 210, modem 212, transport module 214, AV demux 216, network interface 218, storage devices 220, I/O devices 222, audio decoder 224, audio processor 226, video decoder 228, graphics processing unit 230, and display processor 232 may be interconnected (physically, communicatively, and/or operatively) for inter-component communications and may be implemented as any of a variety of suitable circuitry, such as one or more microprocessors, digital signal processors (DSPs), application specific integrated circuits (ASICs), field programmable gate arrays (FPGAs), discrete logic, software, hardware, firmware or any combinations thereof. It should be noted that although example computing device 200 is illustrated as having distinct functional blocks, such an illustration is for descriptive purposes and does not limit computing device 200 to a particular hardware architecture. Functions of computing device 200 may be realized using any combination of hardware, firmware and/or software implementations.

CPU(s) 202 may be configured to implement functionality and/or process instructions for execution in computing device 200. CPU(s) 202 may be capable of retrieving and processing instructions, code, and/or data structures for implementing one or more of the techniques described herein. Instructions may be stored on a computer readable medium, such as system memory 204 or storage devices 220. CPU(s) 202 may include multi-core central processing units.

System memory 204 may be described as a non-transitory or tangible computer-readable storage medium. In some examples, system memory 204 may provide temporary and/or long-term storage. In some examples, system memory 204 or portions thereof may be described as non-volatile memory and in other examples portions of system memory 204 may be described as volatile memory. Examples of volatile memories include random access memories (RAM), dynamic random access memories (DRAM), and static random access memories (SRAM). Examples of non-volatile memories include magnetic hard discs, optical discs, floppy discs, flash memories, or forms of electrically programmable memories (EPROM) or electrically erasable and programmable (EEPROM) memories.

System memory 204 may be configured to store information that may be used by computing device 200 during operation. System memory 204 may be used to store program instructions for execution by CPU(s) 202 and may be used by software or applications running on computing device 200 to temporarily store information during program execution. For example, system memory 204 may store instructions associated with operating system 206, applications 208, and popularity application 209. Applications 208 and popularity application 209 may include applications implemented within or executed by computing device 200 and may be implemented or contained within, operable by, executed by, and/or be operatively/communicatively coupled to components of computing device 200. Applications 208 and popularity application 209 may include instructions that may cause CPU(s) 202 of computing device 200 to perform particular functions. Applications 208 and popularity application 209 may include algorithms which are expressed in computer programming statements, such as, for-loops, while-loops, if-statements, do-loops, etc. Applications 208 and popularity application 209 may be distributed to computing device 200 through an application distribution site, such as, for example, application distribution site 122 described above.

As further illustrated in FIG. 2A, applications 208 and popularity application 209 may execute in conjunction with operating system 206. That is, operating system 206 may be configured to facilitate the interaction of applications 208 and popularity application 209 with CPUs(s) 202, and other hardware components of computing device 200. It should be noted that in some examples, components of operating system 206 and components acting in conjunction with operating system 206 may be referred to as middleware. Further, in some examples, popularity application 209 may include an application programming interface (API). The techniques described herein may be utilized by devices configured to operate using any and all combinations of software architectures. Operating system 206 may be an operating system designed to be installed on laptops, desktops, smartphones, tablets, set-top boxes, digital video recorders, televisions and/or gaming devices. In one example, operating system 206 may include one or more of operating systems or middleware components developed by OpenTV®, Windows® operating systems, Linux operation systems, Mac OS®, Android® operating systems, and any and all combinations thereof.

System interface 210, may be configured to enable communications between components of computing device 200. In one example, system interface 210 comprises structures that enable data to be transferred from one peer device to another peer device or to a storage medium. For example, system interface 210 may include a chipset supporting Accelerated Graphics Port (AGP) based protocols, Peripheral Component Interconnect (PCI) bus based protocols, such as, for example, the PCI Express™ (PCIe) bus specification, which is maintained by the Peripheral Component Interconnect Special Interest Group, or any other form of structure that may be used to interconnect peer devices.

Storage device(s) 220 represent memory of computing device 200 that may be configured to store relatively larger amounts of information for relatively longer periods of time than system memory 204. For example, in the example where computing device 200 is included as part of a digital video recorder, storage device(s) 220 may be configured to store numerous video files. Similar to system memory 204, storage device(s) 220 may also include one or more non-transitory or tangible computer-readable storage media. Storage device(s) 220 may include internal and/or external memory devices and in some examples may include volatile and non-volatile storage elements. Examples of memory devices include file servers, an FTP servers, network attached storage (NAS) devices, a local disk drive, or any other type of device or storage medium capable of storing data. Storage medium may include Blu-ray discs, DVDs, CD-ROMs, flash memory, or any other suitable digital storage media.

I/O devices 222 may be configured to receive input and provide output during operation of computing device 200. Input may be generated from an input device, such as, for example, a push-button remote control, a motion based remote control, a device including a touch-sensitive screen, a device including a track pad, a mouse, a keyboard, a microphone, video camera, a motion sensor, or any other type of device configured to receive input. In one example, an input device may include an advanced user input device, such as a smart phone or a tablet computing device. For example, an input device may be a secondary computing device and may be configured to receive user input via touch gestures, buttons on the secondary computing device, and/or voice control. Further, in some examples, an input device may include a display that is configured to display the graphical users interfaces described herein. For example, in the case where computing device 200 includes a television, an input device may include a smart phone in communication with the television. In this example, a user may provide commands to a television by activating portions of a graphical user interface displayed on a smart phone. Output may be provided to output devices, such as, for example internal speakers, an integrated display device, and/or external components, such as, a secondary computing device. In some examples, I/O device(s) 222 may be operatively coupled to computing device 200 using a standardized communication protocol, such as for example, Universal Serial Bus protocol (USB), Bluetooth, ZigBee or a proprietary communications protocol, such as, for example, a proprietary infrared communications protocol.

Figure 2B:
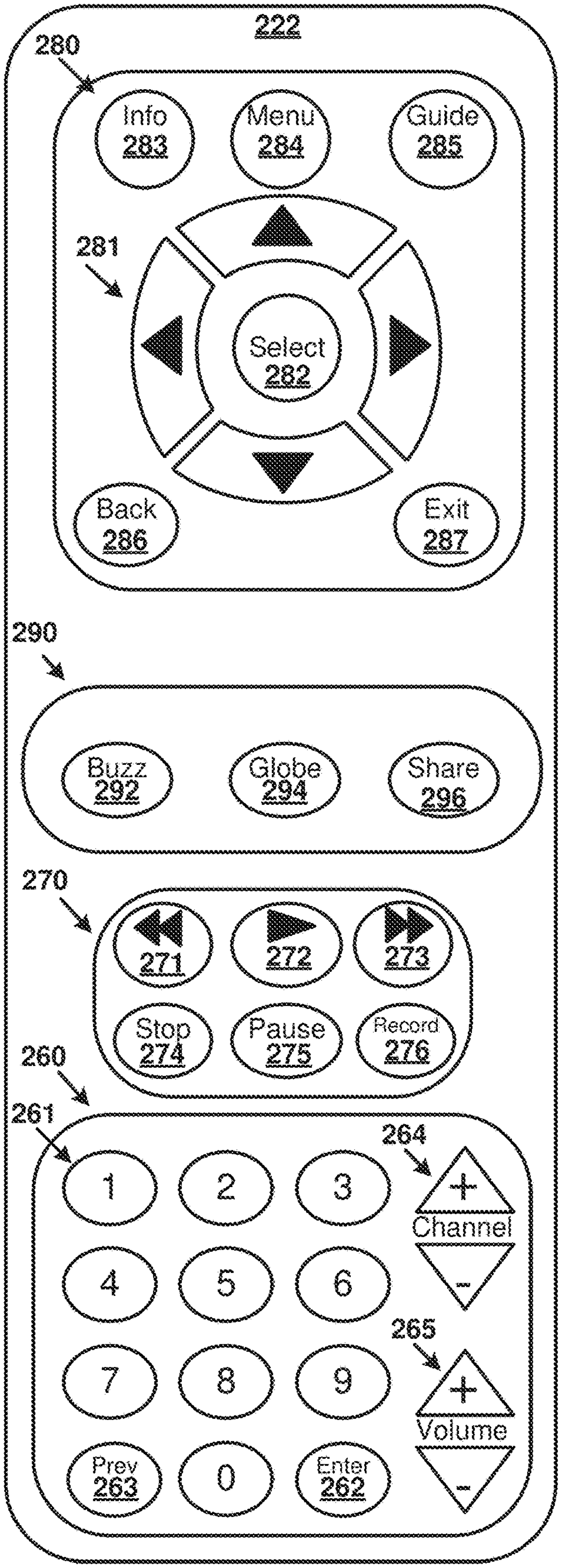
FIG. 2B is a conceptual diagram illustrating an example of an input/output device that may implement one or more techniques of this disclosure.

FIG. 2B is a conceptual diagram illustrating an example of an input/output device that may implement one or more techniques of this disclosure. In the example illustrated in FIG. 2B, I/O device 222 is illustrated as a push-button remote control. It should be noted that while I/O device 222 is illustrated as a push-button remote control in the example illustrated in FIG. 2B, in other examples, the functionality of I/O device 222 may be implemented using other types of I/O devices, such as, for example, a secondary computing device in communication with a primary computing device. Further, in other examples, functions achieved by activation of buttons of I/O device 222 may be achieved through other types of user inputs. For example, in the case where an I/O device includes a touchscreen, gesture recognition, and/or voice recognition, virtual buttons may be presented on the touchscreen and functions achieved by activation of buttons on I/O device 222 may be achieved through any and all combinations of virtual button activation, motion gestures, and/or voice commands. In one example, an I/O device may have voice recognition capabilities and a function achieved by activation of buzz button 292 may be achieved by a user saying "buzz," or a similar phrase.

In the example illustrated in FIG. 2B, I/O device 222 includes basic television controls 260, playback controls 270, navigational controls 280, and application controls 290. Basic television controls 260 may be configured to enable a user to perform basic tuning and volume control functions associated with viewing television programming. As illustrated in FIG. 2B, basic television controls 260 include numeric keypad 261, enter button 262, previous channel button 263, channel change buttons 264, and volume control buttons 265. Numeric keypad 261, enter button 262, previous channel button 263, and channel change buttons 264 may be configured to enable a user to tune to a particular analog and/or digital channel. Upon a user entering a sequence of numbers using numeric keypad 261 and, optionally, additionally activating enter key 262, a tuner may tune to a specified channel. Upon activation of previous channel button 263, a tuner may tune to a previously tuned channel. Activation of "+" and "–" channel buttons 264 may respectively cause a tuner to tune to the respective next channel in a sequence of channels. Activation of "+" and "–" volume control buttons 265 may respectively cause the output of an audio system to be increased or decreased. It should be noted that although the basic television controls 260 may be configured to enable a user to perform basic tuning and volume control functions associated with a television, in some examples, basic television controls 260 may be used to perform other functions associated with a computing device.

Playback controls 270 may be configured to enable a user to control the playback of and/or record multimedia content. For example, playback controls 270 may enable a user to control the playback of a video originating from a media service provider site, an on demand engine, and/or a personal video recorder (PVR). As illustrated in FIG. 2B, playback controls 270 include reverse playback button 271, normal playback button 272, forward playback button 273, stop playback button 274, pause playback button 275, and record button 276. Reverse playback button 271 may enable to a user to navigate to a previous point in a multimedia sequence. Upon activation, normal playback button 272 may cause normal playback of an item of multimedia content to begin or resume. Forward playback button 273 may enable a user to navigate to a future point in a multimedia sequence. Upon activation, stop playback button 274 may cause the playback of an item of multimedia content to cease. Upon activation, pause playback button 275 may cause the playback of an item of multimedia content to be paused. Record button 276 may enable a user to cause an item of multimedia content to be stored to a storage device. In one example, record button 276 may enable a user to record content to a storage device. It should be noted that although playback controls 270 may be configured to enable a user to control the playback of and/or record multimedia content, in some examples playback controls 270 may be used to perform other functions associated with a computing device.

As described above, devices with digital media playback capabilities, including, for example, televisions, set top boxes, and mobile devices, may be configured to provide users thereof with graphical user interfaces that enable the selection of content. Navigational controls 280 may be configured to enable a user to navigate graphical user interfaces and select content using a graphical user interface. In one example, navigational controls 280 may be configured to enable a user to navigate graphical user interfaces and access items of content according to the techniques described herein.

In the example illustrated in FIG. 2B, navigational controls 280 include navigational arrow buttons 281, select button 282, information button 283, menu button 284, guide button 285, back button 286, and exit button 287. Navigational arrow buttons 281 may be configured to move the position of a cursor associated with a graphical user interface and/or change the selection of an item included in a graphical user interface. Select button 282 may enable a user to further select an icon. In one example, consecutive activations of select button 282 may cause respective levels of selection to occur. Information button 283 may be configured to cause additional information associated with an item of content of to be displayed. For example, when an icon representing an item of content is initially selected, activation of information button 283 may cause information associated with the content (e.g., cast and crew information) to be displayed.

Menu button 284, guide button 285, back button 286, and exit button 287 may be configured to enable a user to cause different graphical user interfaces to be presented. Upon activation, menu button 284 may cause a graphical user interface including a high level menu to be displayed. In one example, a high level menu may include a menu that enables a user to change settings associated with the operation of a computing device. In one example, a high-level menu may include a menu that enables a user to select a user profile (e.g., a log-in graphical user interface). Upon activation, guide button 285 may be configured to provide a graphical user interface that enables a user to select content. In one example, upon activation of guide button 285, a graphical user interface including a grid guide may be presented to a user. Back button 286 may be configured to enable a user to return to a previous graphical user interface. Exit button 287 may be configured to enable a user to return to a full screen viewing mode. For example, when a graphical user interface is displayed, upon activation of exit button 287, the graphical user interface may "disappear" and full screen content viewing mode may be presented to a user.

As described above, applications 208 may cause computing device 200 to perform functions associated with the example techniques described herein that enable a user to access items of content. Application controls 290 may cause computing device 200 to initiate execution of an application that causes computing device 200 to perform functions associated with the example techniques described herein. That is, content assistant button 290 may launch a popularity application 209 and/or cause one or more actions associated popularity application 209 to occur. As described in detail below a popularity application 209 may cause one or more graphical user interfaces to be presented. In one example, activation of buzz button 292 may cause graphical user interface 300 to be presented. In one example, activation of globe button 294 may cause graphical user interface 500 to be presented. In one example, activation of share button may cause graphical user interface 600, as illustrated in FIG. 6B to be presented.

Referring again to the example illustrated in FIG. 2A, computing device 200 is configured to send and receive data via a television network, such as, for example, television network 106 described above and send and receive data via a public network, such as, for example, public network 108. As described above, a communications network may be described based on a model including layers that define communication properties, such as, for example, physical signaling, addressing, channel access control, packet properties, and data processing in a communications system. In the example illustrated in FIG. 2A, modem 212, transport module 214, and AV demux 216 may be configured to perform lower layer processing associated with television network 106 and network interface 218 may be configured to perform lower layer processing associated with public network 108.

In one example, modem 212 may be configured to perform physical signaling, addressing, and channel access control according to the physical and MAC layers utilized in a television provider network, such as for example, television provider network 106. In one example, modem 212 may configured to receive signals from a coaxial cable and/or an over the air signal and perform low level signal processing (e.g., demodulation). In one example, modem 212 may be configured to extract transport streams from signals received from a coaxial cable. In one example, a transport stream may be based on a transport stream defined by the Moving Pictures Experts Group (MPEG). In one example, a transport stream may include a plurality of program streams where each program stream respectively corresponds to a program available from a television network. Further, a transport stream may include a plurality of data streams (e.g., Program Map Table and EPG data).

Transport module 214 may be configured to receive data from modem 212 and process received data. For example, transport model 214 may be configured to receive a transport stream including a plurality of program streams and extract individual program streams from a received transport stream. In one example, a program stream may include a video stream, an audio stream, and a data stream. AV demux 216 may be configured to receive data from transport module 214 and process received data. For example, AV demux 216 may be configured to receive a program stream from transport module 214 and extract audio packets, video packets, and data packets. That is, AV demux 216 may apply demultiplexing techniques to separate video streams, audio streams, and data streams from a program stream. In one example, AV demux 216 may be configured to decapsulate packetized elementary video and audio streams from a transport stream defined according to MPEG-2 Part 1. It should be noted that although modem 212, transport module 214, and AV demux 216 are illustrated as having distinct functional blocks, the functions performed by modem 212, transport module 214, and AV demux 216 may be highly integrated and realized using any combination of hardware, firmware and/or software implementations.

Network interface 218 may be configured to enable computing device 200 to send and receive data via a public network. As described above, data sent or received via a public network may include data associated digital content, such as, for example, music, videos, images, webpages, messages, voice communications, and applications. Network interface 218 may include a network interface card, such as an Ethernet card, an optical transceiver, a radio frequency transceiver, or any other type of device configured to send and receive information. Network interface 218 may be configured to perform physical signaling, addressing, and channel access control according to the physical and MAC layers utilized in a public network, such as for example, public network 108. Further, in a manner similar to that described above with respect to transport module 214 and AV demux 216, network interface 218 may be configured to extract audio packets, video packets, and data packets from a data stream. For example, network interface 218 may be configured to extract video packets, audio packets, and data packets according to one or more of internet protocol (IP), transport control protocol (TCP), real time streaming protocol (RTSP), user datagram protocol (UDP), real time protocol (RTP), MPEG transport stream protocols, and IPTV protocols. It should be noted, that the techniques described herein are generally applicable to any and all methods of digital content distribution and are not limited to particular communications network implementations. For example, the techniques described herein may be applicable to digital content originating from one or more of a broadcast, a multicast, a unicast, an over the top content source, a personal video recorder (PVR), and a peer-to-peer content source.

Referring again to FIG. 2A, data associated with digital content, such as, for example, music, videos, images, webpages, messages, voice communications, and applications may be stored in a computer readable medium, such as, for example, system memory 204 and storage devices 220. Data stored in a memory device may be retrieved and processed by CPU(s) 202, audio decoder 224, audio processor 226, video decoder 228, graphics processing unit 230, and display processor 232. As described above, CPU(s) 202 may be capable of retrieving and processing instructions, code, and/or data structures for implementing one or more of the techniques described herein. Each of audio decoder 224, audio processor 226, video decoder 228, graphics processing unit 230, and display processor 232 may also be capable of retrieving and processing instructions, code, and/or data structures for implementing one or more of the techniques described herein.

Audio decoder 224 may be configured to retrieve and process coded audio data. For example, audio decoder 224 may be a combination of hardware and software used to implement aspects of audio codec. Audio data may be coded using multi-channel formats such as those developed by Dolby and Digital Theater Systems. Audio data may be coded using a compressed or uncompressed format. Examples of compressed audio formats include MPEG-1, 2 Audio Layers II and III, AC-3, AAC, and Ogg Vorbis. An example of an uncompressed audio format includes pulse-code modulation (PCM) audio format. Audio processor 226 may be configured to retrieve captured audio samples and may process audio data for output to an audio system (not shown). In some examples, audio processor 226 may include a digital to analog converter. An audio system may comprise any of a variety of audio output devices such as headphones, a single-speaker system, a multi-speaker system, or a surround sound system.

Video decoder 228 may be configured to retrieve and process coded video data. For example, video decoder 228 may be a combination of hardware and software used to implement aspects of video codec. In one example, video decoder 228 may be configured to decode video data encode according to any number of video compression standards, such as ITU-T H.261, ISO/IEC MPEG-1 Visual, ITU-T H.262 or ISO/IEC MPEG-2 Visual, ITU-T H.263, ISO/IEC MPEG-4 Visual, ITU-T H.264 (also known as ISO/IEC MPEG-4 AVC), VP8 and High-Efficiency Video Coding (HEVC).

As described above, a device with media playback capabilities may provide a graphical user interface (e.g., an EPG) that enables a user to select content. A graphical user interface may include images and graphics displayed in conjunction with video content (e.g., playback icons overlaid on a video). Graphics processing unit 230 is an example of a dedicated processing unit that may be configured to generate graphical user interfaces including the graphical user interfaces described herein. That is, graphics processing unit 230 may be configured to receive commands and content data and output pixel data. Graphic processing unit 230 may operate according to a graphics pipeline process (e.g., input assembler, vertex shader, geometry shader, rasterizer, pixel shader, and output merger). Graphics processing unit 203 may include multiple processing cores and may be configured to operate according to OpenGL (Open Graphic Library, managed by the Khronos Group) and/or Direct3D (managed by Microsoft, Inc.).

Display processor 232 may be configured to retrieve and process pixel data for display. For example, display processor 232 may receive pixel data from video decoder 228 and/or graphics processing unit 230 and output data for display. Display processor 232 may be coupled to a display, such display 250 (not shown in FIG. 1) using a standardized communication protocol (e.g., HDMI, DVI, DisplayPort, component video, composite video, and/or VGA). Display 250 may comprise one of a variety of display devices such as a liquid crystal display (LCD), a plasma display, an organic light emitting diode (OLED) display, or another type of display device capable of presenting video data to a user. Display 250 may include a standard definition television, a high definition television, or an ultra-resolution display. Further, display 250 may include an integrated display of a portable computing device (e.g., a mobile phone, a laptop, a personal digital assistant (PDA), or a tablet device). As described above, in some examples, a portable computing device may operate as an I/O device for a stationary computing device.

As described above, content popularity site 128 may generate one or more of the following ranking values: on demand requests value, media service requests value, rentals value, social media value, and search requests value. As further described above, content popularity site 128 may provide ranking values to one or more computing devices. Computing device 200 may be configured to display and/or sort available content based on popularity rankings (e.g., one or more ranking values). That is, computing device 200 may be configured to receive a popularity ranking and enable the selection of content by providing one or more of the graphical user interfaces described herein. In one example, popularity application 209 may be configured to generate one or more graphical user interfaces based on popularity rankings.

As further described above, in one example, content popularity site 128 may receive viewing data from an application implemented on a user's computing device and provide the viewing data to an application implemented on another user's computing device. As described in detail below, in one example, popularity application 209 may be configured to generate one or more graphical user interfaces based user viewing data received from content popularity site 128.

FIGS. 3A-3E are conceptual diagrams illustrating an example of a graphical user interface in accordance with one or more techniques of this disclosure. Graphical user interface 300 represents an example of a graphical user interface that may enable a user to select content based on popularity information. Graphical user interface 300 may be similar to graphical user interfaces described in commonly assigned, currently pending, U.S. patent application Ser. No. 14/260,677, filed Apr. 24, 2014, which is hereby incorporated by reference in its entirety. As described above, in one example, activation of buzz button 292 may cause graphical user interface 300 to be presented.

Figure 3A:
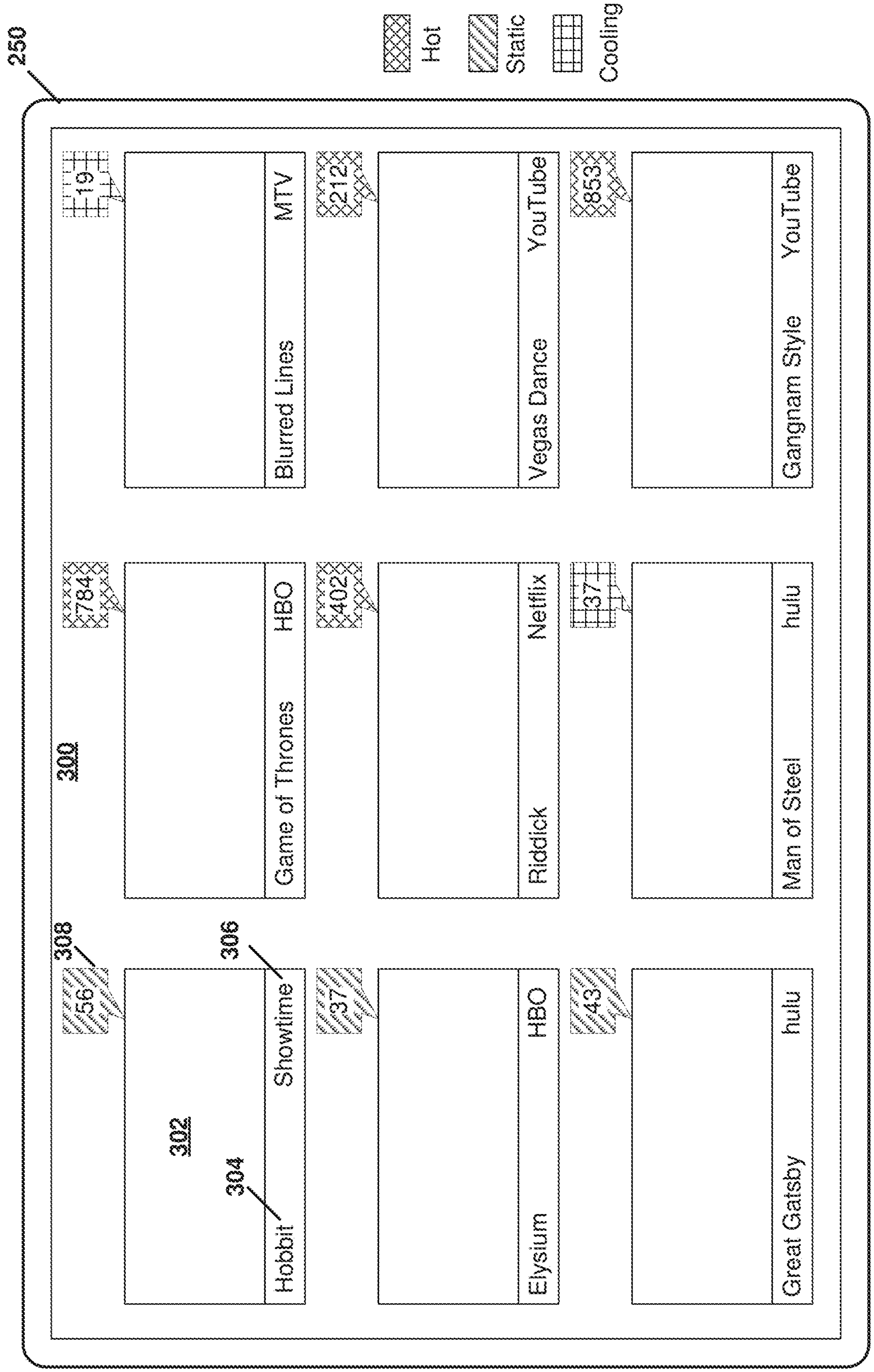
FIGS. 3A-3E are a conceptual diagrams illustrating an example of a graphical user interface in accordance with one or more techniques of this disclosure.
Figure 3B:
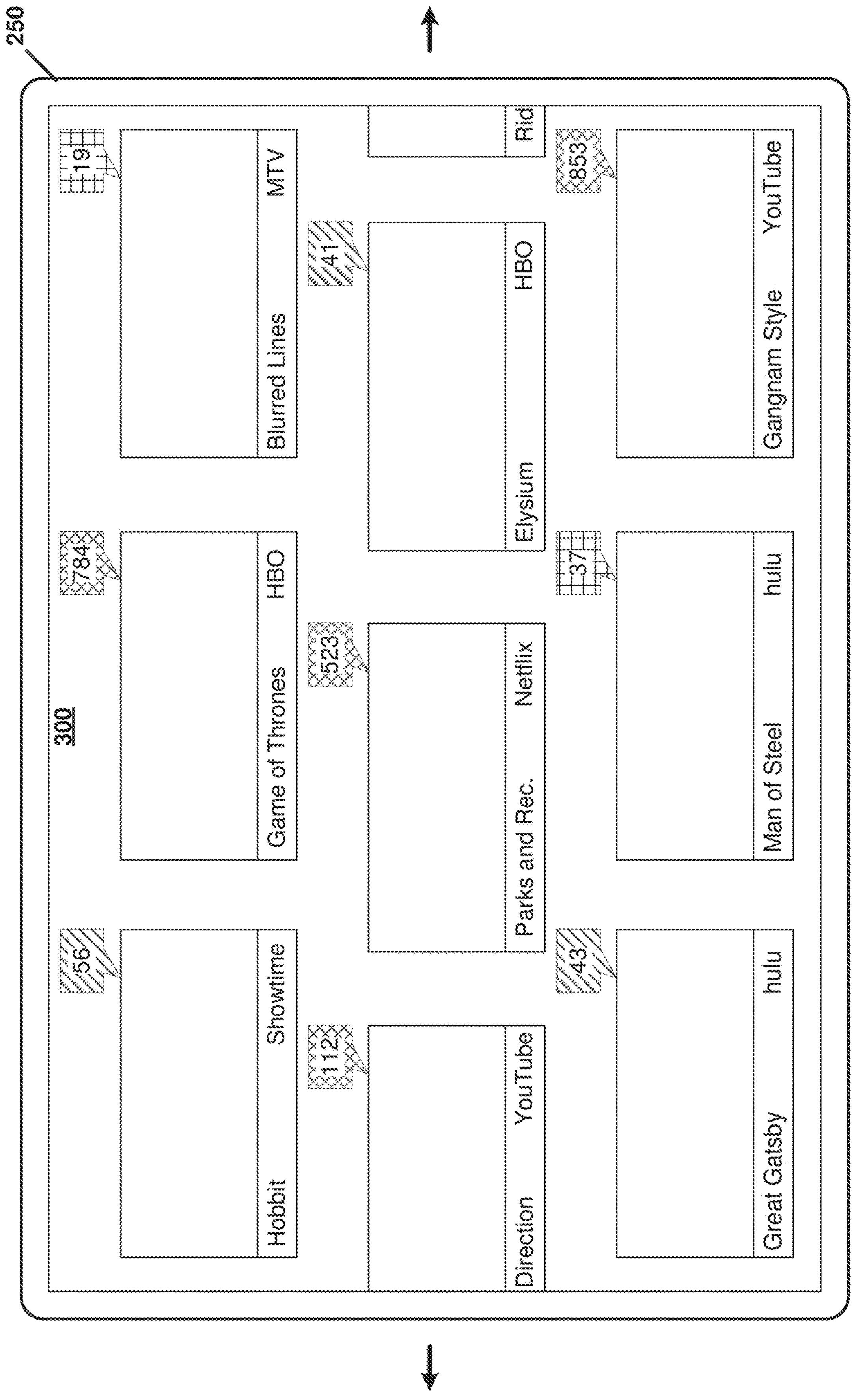

As illustrated in FIG. 3A-3B, graphical user interface 300 includes a plurality of information windows 302 respectively associated with an item of content. Information window 302 may identify an available item of content and may include a high resolution image identifying an item of content (e.g., a movie poster or a production still). As illustrated in FIG. 3A, each information window 302 includes a title identifier 304, a source identifier 306, and a popularity indicator 308. Title identifier 304 may identify the title of an item of content (e.g., the title of a movie or television program). Source identifier 306 may identify a source of the content. For example, source identifier 306 may identify a media service provider or a television network. Further, in an example where an information window 302 is associated with pay per view content available from a television service provider, source identifier 306 may include a price to access the content.

As described above, a computing device may receive a numeric value indicating the popularity ranking of available content. Popularity indicator 308 provides a user with a visual indicator of a popularity ranking. In one example, popularity indicator 308 may simply be a received numeric value. In other examples, popularity application 209 may be configured to generate a numeric value based on a received number value. For example, popularity application 209 may be configured to adjust a received numeric value based on one or more user preferences. In the example illustrated in FIG. 3A, popularity indicator 308 is a numeric value indicating the popularity of a particular item of content, where a higher numeric value indicates that a higher level of popularity. In other examples, popularity indicator 308 may include a graphical indicator of popularity including, for example, a number of stars.

As further illustrated in FIG. 3A, in addition to including a numeric value, popularity indicators 308 include a background pattern indicating with a particular item of content has a hot, static, or cooling status, where a hot status indicates that a particular item of content is significantly increasing in popularity, a static status indicates that a particular item of content is neither significantly increasing or decreasing in popularity, and a cooling status indicates that a particular item of content is significantly decreasing in popularity. In one example, popularity application 209 may be configured to determine whether a particular item of content has a hot status, a static status, or a cooling status based on rates of change thresholds.

As described above, the numeric value indicating the popularity ranking may be referred to as a buzz factor and an algorithm used to determine a buzz factor and the frequency at which a buzz factor is updated may be selected such that the presentation of available content within a graphical user interface varies in a manner that will make a user more or less likely to select a particular item of content. In one example, popularity application 209 may be configured to determine whether a particular item of content has a hot status, a static status, or a cooling status based on changes to a determined buzz factor. For example if a buzz factor is decreasing at a rate of five units per minute, a particular item of content may be cooling.

It should be noted that although hot, static, and cooling statuses are illustrated using patterns in FIG. 3A, in practice, hot, static, and cooling statuses may be indicated using colors, e.g., hot (red), static (orange) or cooling (blue). In one example, a status indicator may be referred to as a buzz meter. In one example, popularity application 209 may request information from content popularity site 128 in order to update popularity indicators 308. In another example, when an item of content is endorsed on a social media service, content popularity site 128 may push the updated popularity information to popularity application 209. Popularity application 209 may then update popularity indicators 308 on graphical user interface 300. In the example illustrated in FIG. 3A, a user may see counter values increase or decrease and/or a statuses change for each information window 302. In one example, popularity indicators may effectively be updated in real time.

As described above, a computing device may be configured to receive user input via an I/O device. In one example, a user of computing device 200 may be able to select an information window 302 of graphical user interface 300 using I/O device 222. Graphical user interface 300 may be configured such that each information window 302 is capable of multiple levels of selection. For example, a user may be able to use an I/O device to move a cursor, where a cursor may be a visible or invisible cursor, to the location of an information window 302 and remaining on the information window 302 for a predetermined amount of time may be associated with one level of selection and activation of one or more controls on an I/O device (e.g., a single tap or a double tap on a touch-sensitive display) may be associated with other levels of selection (e.g., display information or provide a preview).

In one example, graphical user interface 300 may be configured to enable four levels of selection for each information window 302: a level that enlarges or highlights an information window 302, a level that provides information associated with information window 302 (e.g., cast and crew information), a level that provides a preview of content associated with an icon (e.g., a trailer), and a level that provides full access to content associated with an icon (e.g., play movie or television show or launch an application). In this manner, by providing graphical user interface 300 computing device 200 enables a user to select content based on popularity rankings.

Figure 3C:
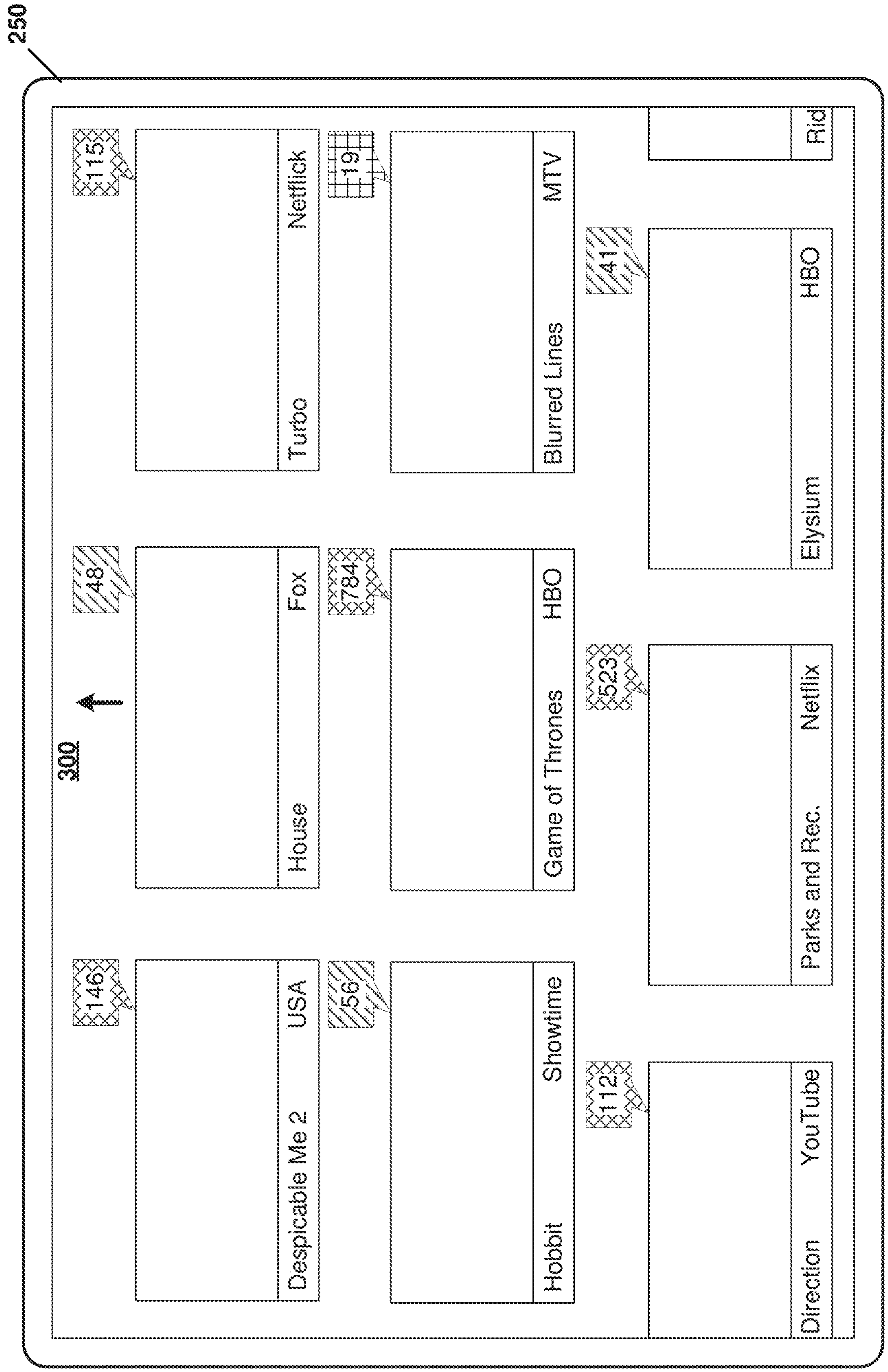

Further, computing device 200 may be configured to enable a user to view additional items of content for possible selection. In one example, graphical user interface 300, as illustrated in FIG. 3B, may be presented to a user when a user performs a pan right command/gesture using an I/O device and/or presses a right arrow button on an I/O device while graphical user interface 300, as illustrated in FIG. 3A, is displayed. As illustrated in FIG. 3B, information windows in the middle row of graphical user interface 300 effectively move to the left and new information windows appear in graphical user interface 300. Thus, computing device 200 may enable a user to effectively scroll through items of content by within a row. In one example, if a user continues to scroll in the same direction, information windows may "loop" back onto display 250. Further, in one example, rows of content may represent a category of content. For example, a middle row may include available movies and a bottom row may include available television shows. In addition to enabling a user to scroll for items of available content by row, computing device 200 may enable a user to scroll for content vertically. In one example, graphical user interface 300, as illustrated in FIG. 3C, may be presented to a user when a user performs a pan up command/gesture using an I/O device and/or presses an up arrow button on an I/O device while graphical user interface 300, as illustrated in FIG. 3B is displayed. As illustrated in FIG. 3C, information windows in the middle row of graphical user interface 300 effectively move down and new information windows appear in graphical user interface 300. In one example, if a user continues to scroll in the same direction information windows may "loop" back onto display 250.

Figure 3D:
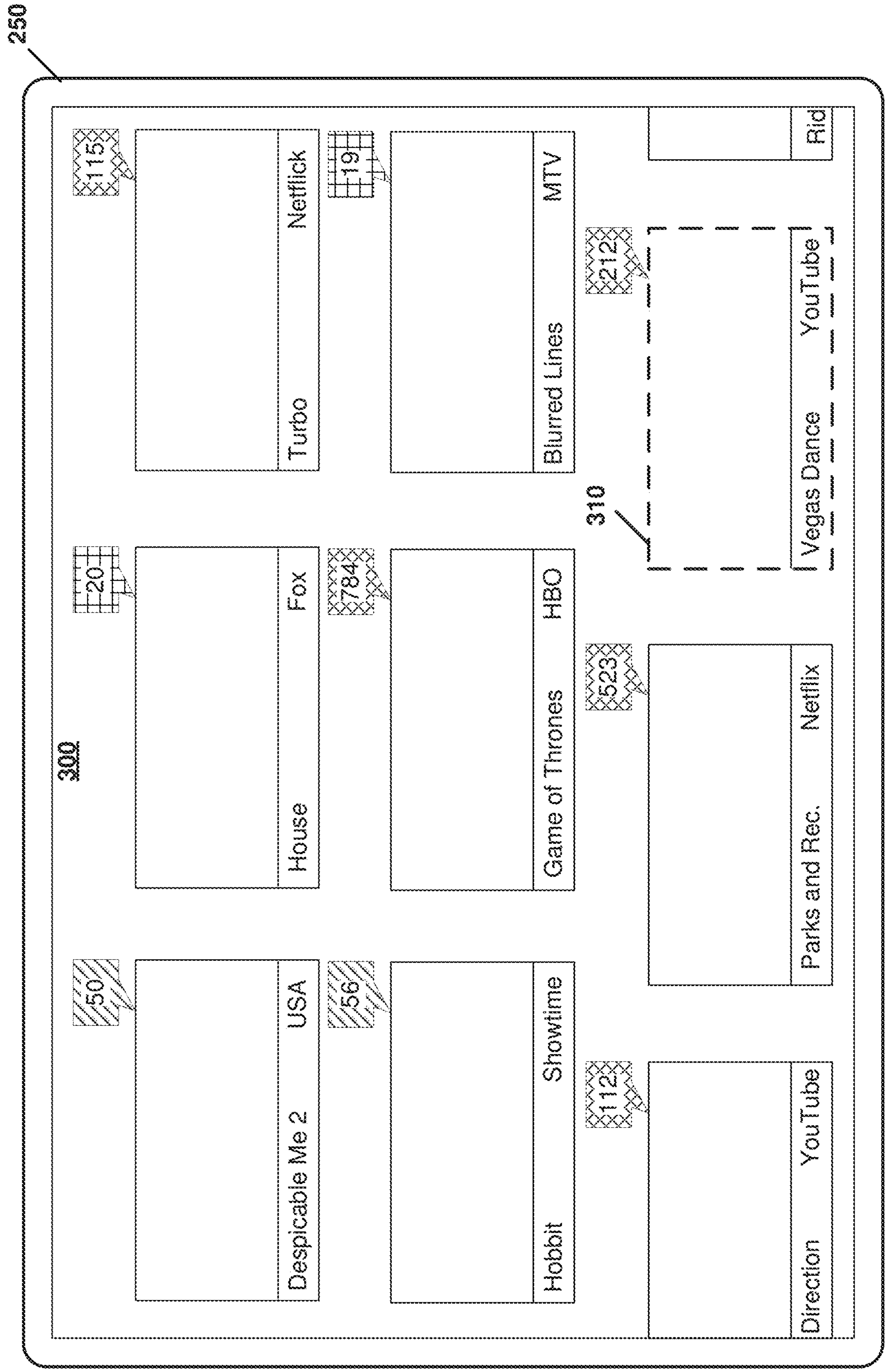

In addition to using popularity information to generate popularity indicators 308, computing device 200 may present items of content based on popularity information. In one example, graphical user interface 300, as illustrated in FIG. 3D may be displayed. Graphic user interface 300, as illustrated in FIG. 3D, includes information window 310 where information window "replaces" an information window included in graphical user interface 300, as illustrated in FIG. 3C. In this example, popularity application 209 may determine that an item of content (i.e., Elysium) is unlikely to be selected by a user based on a cooling status and may replace the item of content with an item of content more likely to be selected by a user (i.e., Vegas Dance). In another example, popularity application 209 may position information windows within a graphical user interface based on a likelihood of selection. For example, more popular items of content may be initially displayed and/or positioned toward the center of a graphical user interface.

Figure 3E:
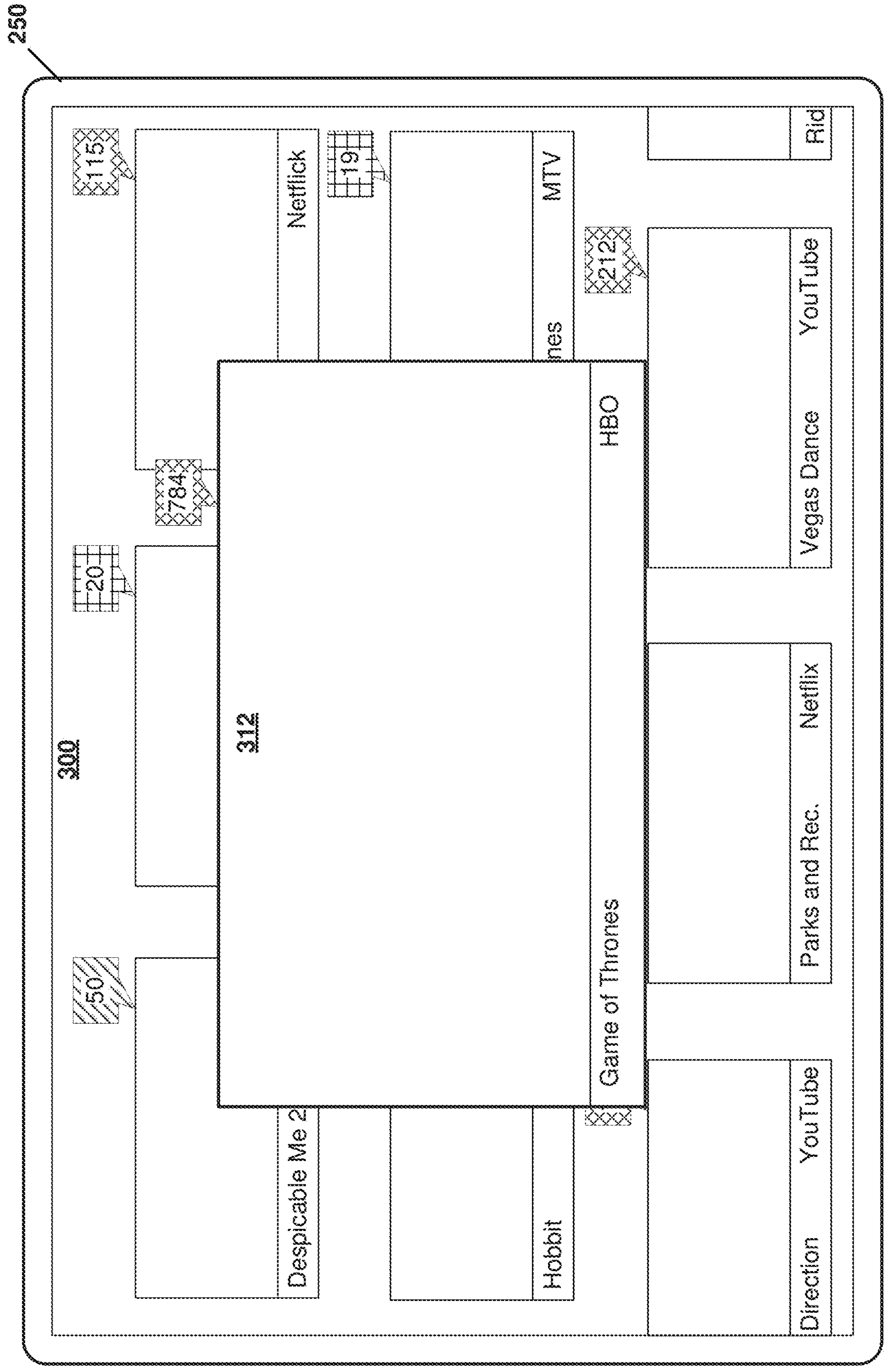

As described above, graphical user interfaces may be configured such that each information window is capable of multiple levels of selection. In one example, graphical user interface 300, as illustrated in FIG. 3E, may be displayed upon additional selection of an item of content (i.e., Game of Thrones). As illustrated in FIG. 3E, graphical user interface 300 includes preview window 312. In one example, a user may activate one or more controls on an I/O device (e.g., a single tap or a double tap on a touch-sensitive display) to indicate a further level of selection for an information window and upon receiving a further level of selection computing device 200 may provide preview window 312. Preview window 312 may provide a video preview associated with an item of content. A video preview may include a trailer associated with an item content or in the case where an item of content includes on air content, may include the item of content in progress. In this manner, graphical user interface 300 represents an example of a graphical user interface that enables a user to select content based on popularity rankings.

Figure 4:
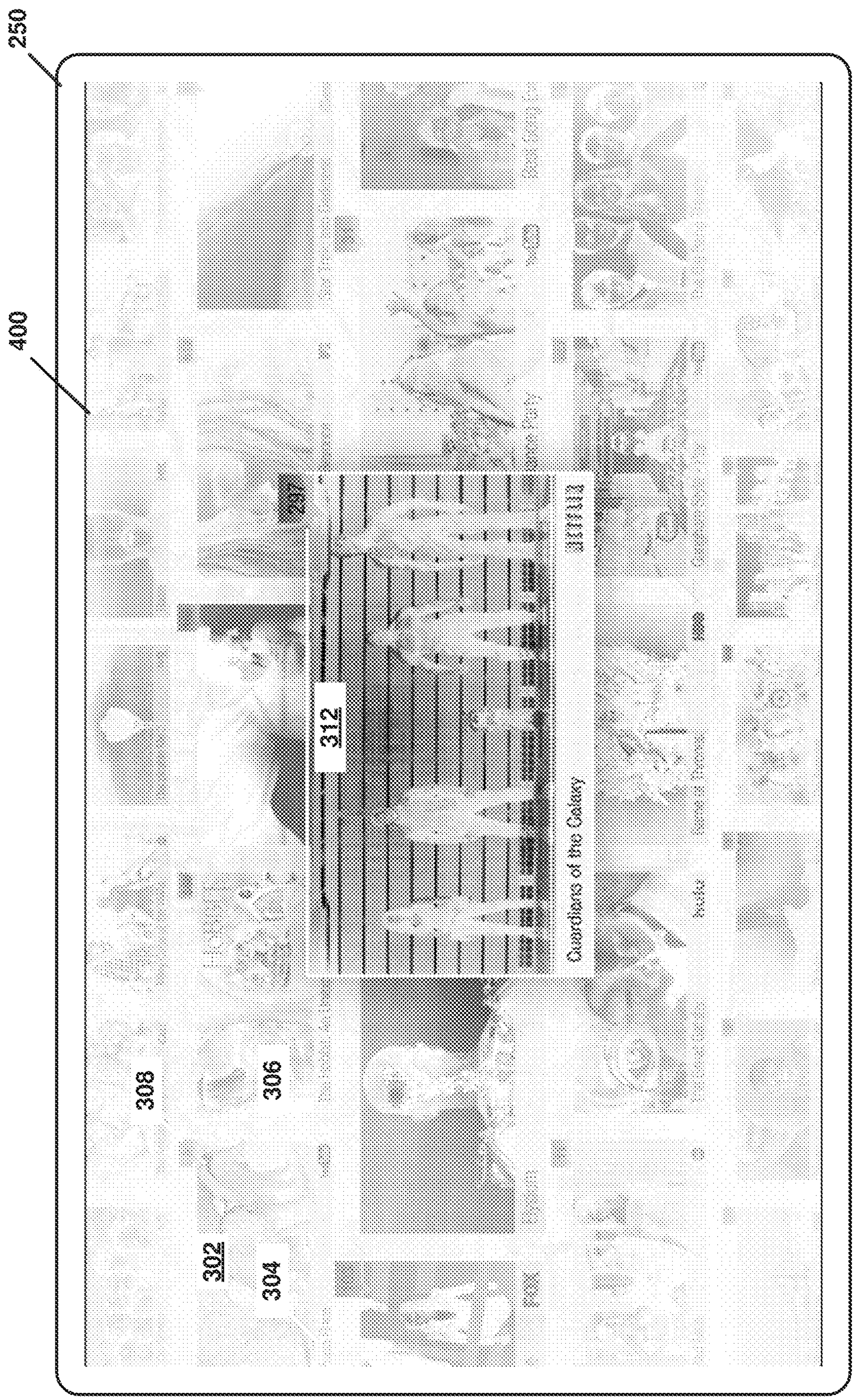
FIG. 4 is a conceptual diagram illustrating an example of a graphical user interface in accordance with one or more techniques of this disclosure.

It should be noted that in some example implementations, a graphical user interface that enables a user to select content based on popularity rankings may include detailed graphics and animations. Detailed graphics and animations may provide a user with a more enjoyable experience, which may result in the user accessing more content and ultimately may generate more revenue for a television service provider or a media service provider. FIG. 4 illustrates an example implementation of a graphical user interface that enables a user to select content based on popularity rankings. As illustrated in FIG. 4, graphical user interface 400 includes detailed graphics for each of information window 302, title identifier 304, a source identifier 306, popularity indicator 308, and preview window 312.

As described above, the graphical user interface 300 enables a user to select content based on popularity rankings. As further described above, it may be useful for a user to select content based on regionally popularity and/or based on content members of a user's social circle have accessed or are accessing. In one example, popularity application 209 may be configured to generate one or more graphical user interfaces that enable a user to select content based on what is regionally popular and/or based on what members of a user's social circle are accessing in addition to popularity rankings. Graphical user interface 500 described below with respect to FIGS. 5A-5G is an example of a graphical user interface that enables a user to select content based on what is regionally popular and/or based on what members of a user's social circle are accessing. In one example, it may be useful for a user to be able to transition from a graphical user interface enabling a user to select content based on popularity rankings to a graphical user interface that enables a user to select content based regionally popular and/or based on what members of a user's social circle are accessing. For example, a graphical user interface that enables a user to select content based on popularity rankings may initially be presented to a user and upon a user wishing to browse additional/alternative items of content, a graphical user interface that enables a user to select content based regionally popular and/or based on what members of a user's social circle are accessing may be presented. In this manner, popularity information may be used to present generally popular items of content to a user and regionally popular and/or a user's social circle may be used to present more specific items of content to a user.

In one example, when a buzz view is displayed (e.g., graphical user interface 300 or graphical user interface 400), a user may cause respective globe graphical user interfaces illustrated in FIGS. 5A-5G to be displayed. It should be noted that graphical user interface 500 may more generally be referred to as a graphical user interface including locational information, a graphical user interface including a map, or a graphical user interface including identifiers of users at respective locations. In some examples, the geographical area that is displayed on graphical user interface 500 may be based on the location of members of a user's social circle. For example, members of a user's social circle may be located within a single country or continent. In this case, the single country or continent may be displayed in graphical user interface 500.

In one example, a user may activate a dedicated globe button on a remote control (e.g., globe button 294) to cause graphical user interface 500 to be presented. In one example, a user may vocalize an equivalent command (e.g., "show friends"). In one example, where display 250 and/or an I/O device includes touchscreen capabilities, a user perform a zoom out gesture (e.g., a reverse pinch) to cause graphical user interface 500 to be presented. In one example, a user may perform a zoom out gesture when graphical user interface 300 is displayed. In this manner, computing device 200 may be configured to enable a user to efficiently transition from graphical user interface 300 to graphical user interface 500. Such a transition may enable a user to efficient browse and/or select items of content.

Figure 5A:
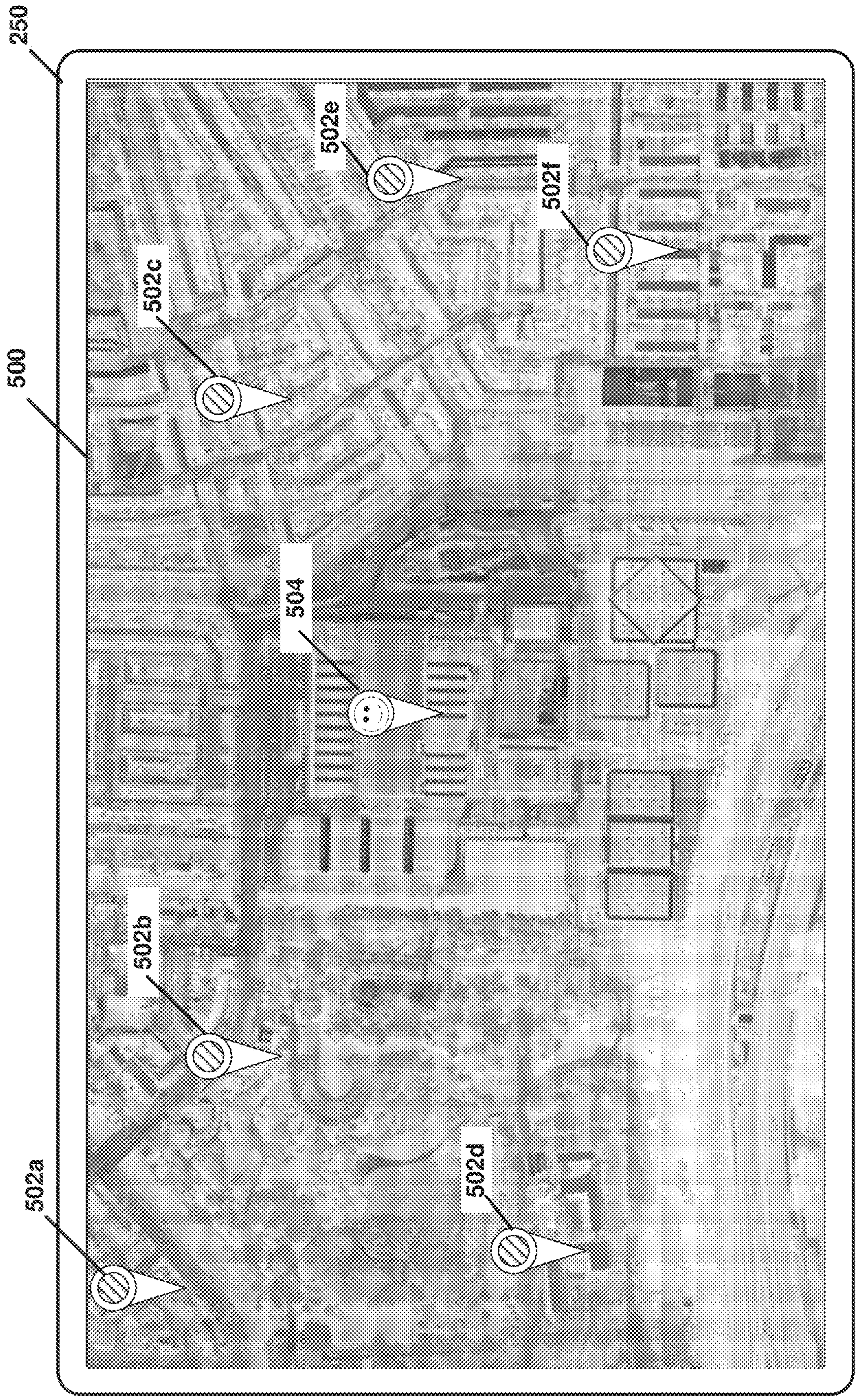
FIGS. 5A-5G are conceptual diagrams illustrating an example of a graphical user interface in accordance with one or more techniques of this disclosure.
Figure 5B:
Figure 5C:
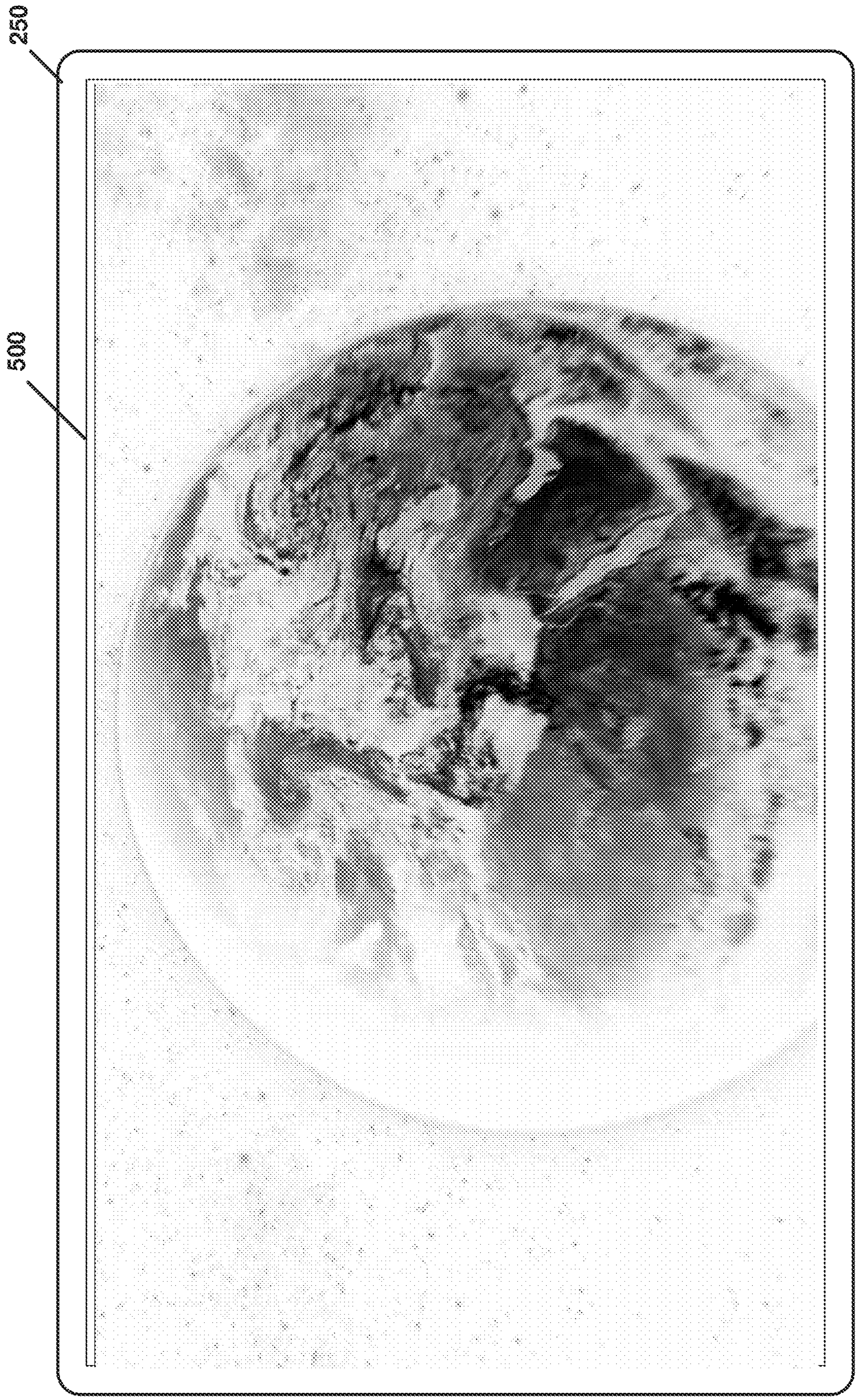

As illustrated in FIGS. 5A-5G, graphical user interface 500 includes pins associated with a user's friends 502*a*-502*j*, pin associated with user 504, a globe 506, and video preview windows 508*a*-508*b*. As illustrated in FIG. 5A, pin associated with the user 504 is initially displayed at the user's location. Pins associated with a user's friends 502*a*-502*j* may include pins associated with members of a user's social network including a proprietary social network maintained by a television service provider or a media service provider. Pins associated with a user's friends 502*a*-502*j* are displayed on graphical user interface 500 at respective locations associated with user's friends. A location associated with a user's friend may include an address associated with a user's friend or current location of a device associated with a user's friend. Each of pins 502*a*-502*j* may include a respective visual identifier associated with a user's friend (e.g., a profile picture or the like).

As illustrated in FIGS. 5A-5D, graphical user interface 500 may zoom out from a view showing the user's location to display locations of a user's friends. In one example, a zoom out may occur automatically. That is, for example, graphical user interface 500 may zoom out from the view presented in FIG. 5A to the view presented in FIG. 5D, according to a defined animation sequence, upon a user causing graphical user interface 500 to be presented. In other examples, a user may control the zooming process (e.g., using navigation arrow keys on a remote control). For example, a user may zoom out from a city view to a state view to a country view to a globe view by holding down a button on a remote control or performing subsequent zoom out commands.

Figure 5D:
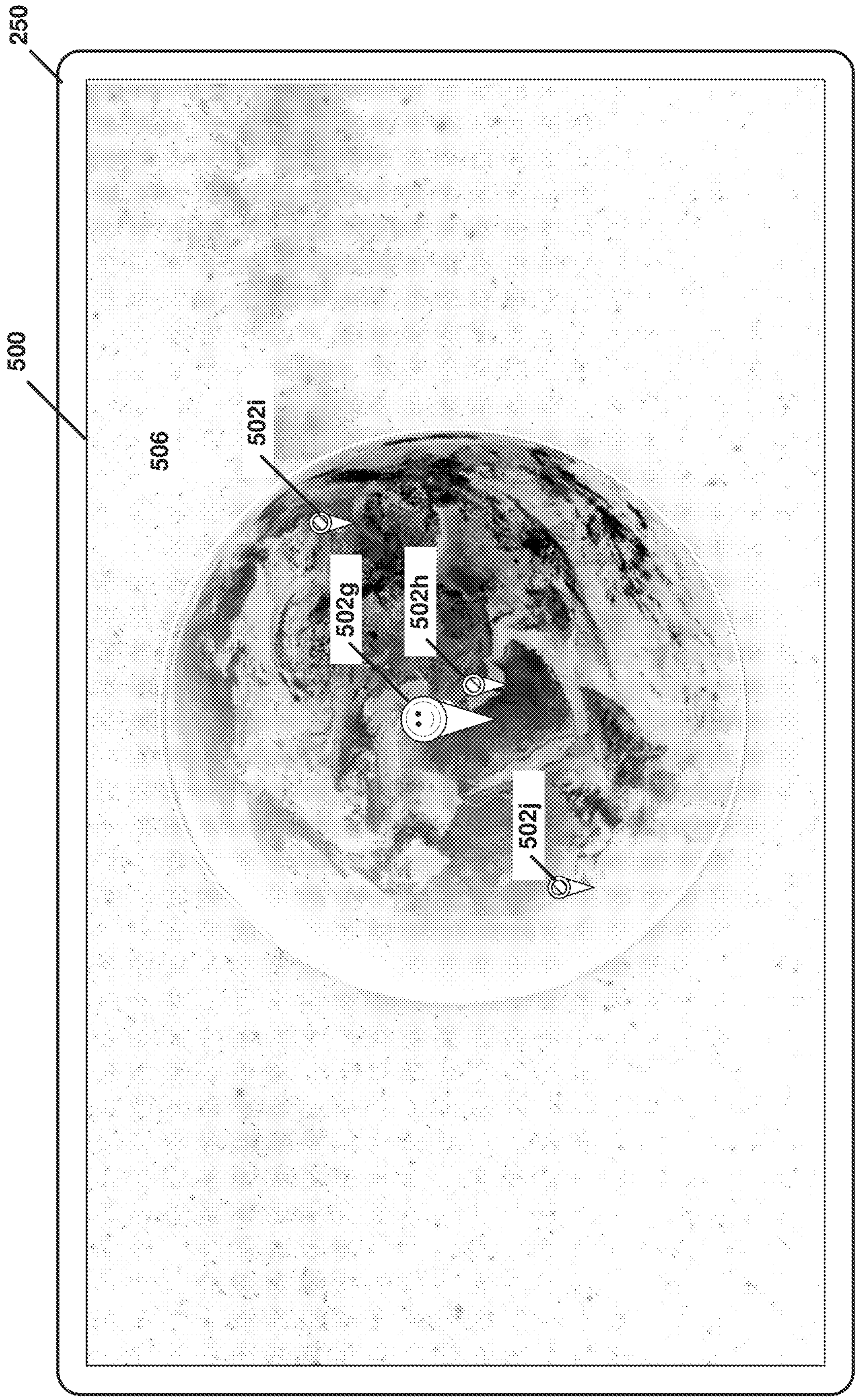

In one example, after an initial zoom out is completed, as illustrated in FIG. 5D, a user may navigate to each friend's location on globe 506. For example, a user may activate directional arrow keys on a remote control to cause globe 506 to rotate to a friend's location. When a user navigates to a friend's location, the icon representing the friend may become available for additional selection. In one example, additional selection may occur by a user remaining on the friend's location for a predetermined amount of time (e.g., two seconds) and/or activating an Enter or Select button (e.g., select button 282) on a remote control. In the example illustrated in FIGS. 5E-5G, additional selection causes content a friend is accessing to be displayed in preview windows 508*a*-508*b*. Preview windows 508*a*-508*b* may be similar to preview window 312 described above. In one example, preview windows 508*a*-508*b* may include a video displaying the content in progress (e.g., live event progress), an image associated with content (e.g., a movie poster), and/or a trailer associated with content.

Figure 5E:
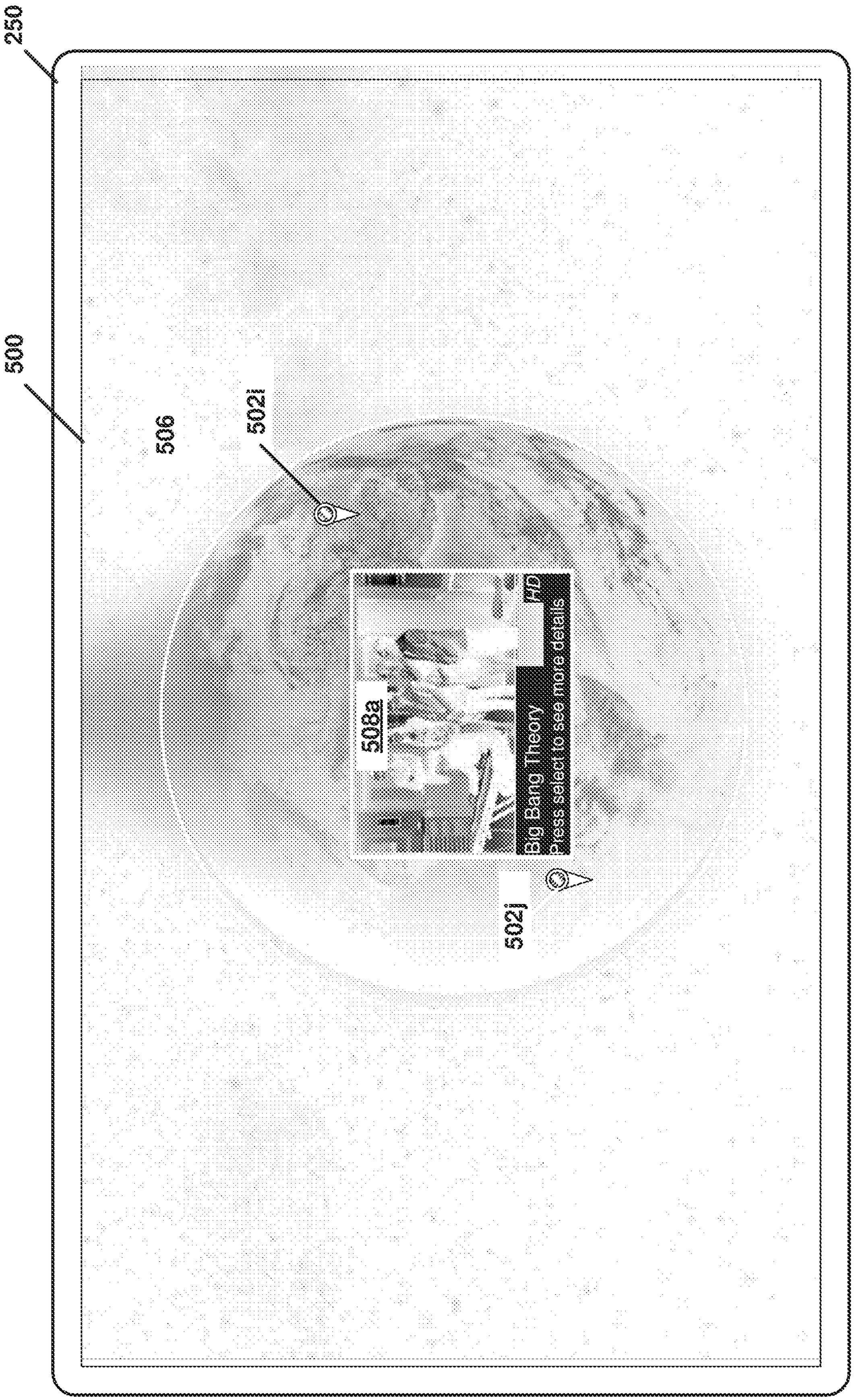
Figure 5F:
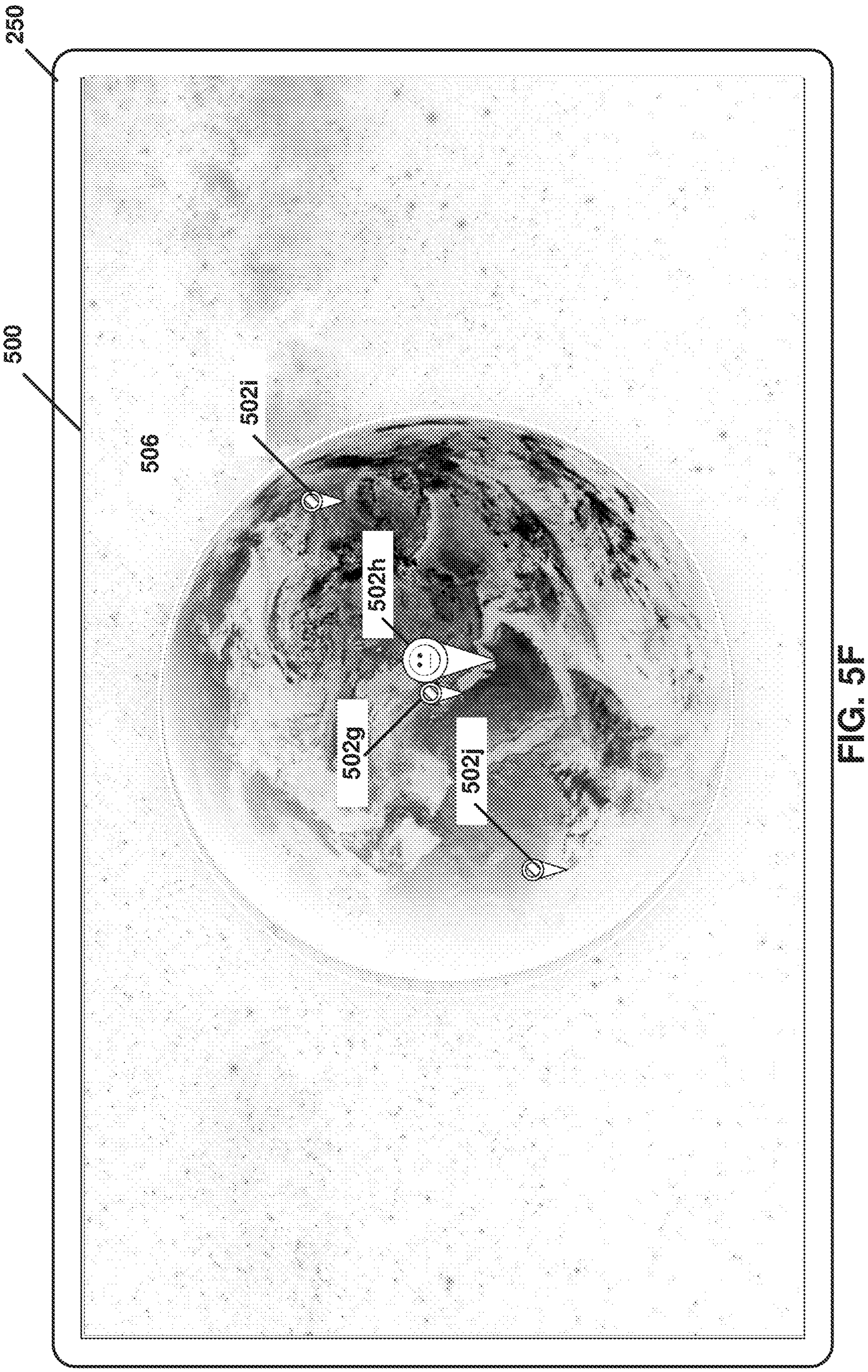
Figure 5G:
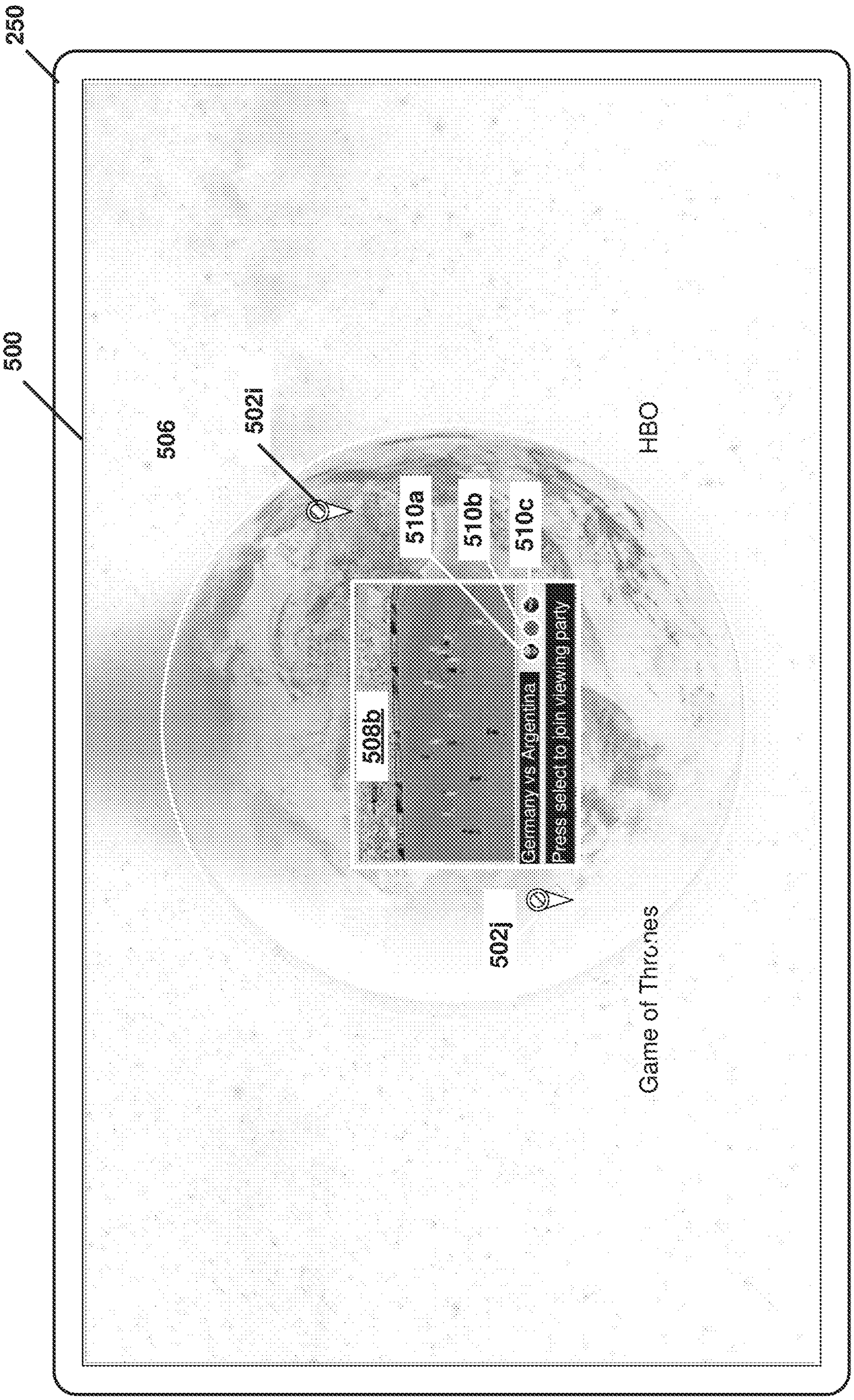

In the example illustrated in FIGS. 5D-5E, additionally selecting pin 502*g* (e.g., remaining on icon 502*g* for a predetermined amount of time) causes preview window 508*a* to be displayed. As illustrated in FIG. 5E, a user may further select preview window 508*a* (e.g., select to see more information about the item of content). Further, a user may navigate to another pin. FIG. 5F represents an example where a user navigates from pin 502*g* to pin 502*h*. FIG. 5G represents an example where a user further selects pin 502*h*. In the example illustrated in FIG. 5G, a friend located in Kuwait (represented by pin 502*h*) is accessing a live sporting event and the preview window 508*b* may display the event in progress. As further illustrated in FIG. 5G, preview window 508*b* includes identifiers 510*a*-510*c* (circles with images in the lower right corner of video preview window 508*b*) of other friends accessing the same live sporting event. Thus, graphical user interface 500 illustrated in FIGS. 5A-5G may provide multiple ways for a user to see what the user's friends are accessing (i.e., global navigation and indications in video preview window). As described above, with respect to FIG. 3E, video preview windows may be available for additional selection. In one example, a user may request more information associated with content in a video preview window. In other examples, a user may cause content displayed in a video preview window to be presented in a full screen viewing mode. In one example, a user may initiate a viewing party. In the example illustrated in FIG. 5G a user may initiate a viewing party by activating select button 282 or performing an equivalent command.

Figure 6A:
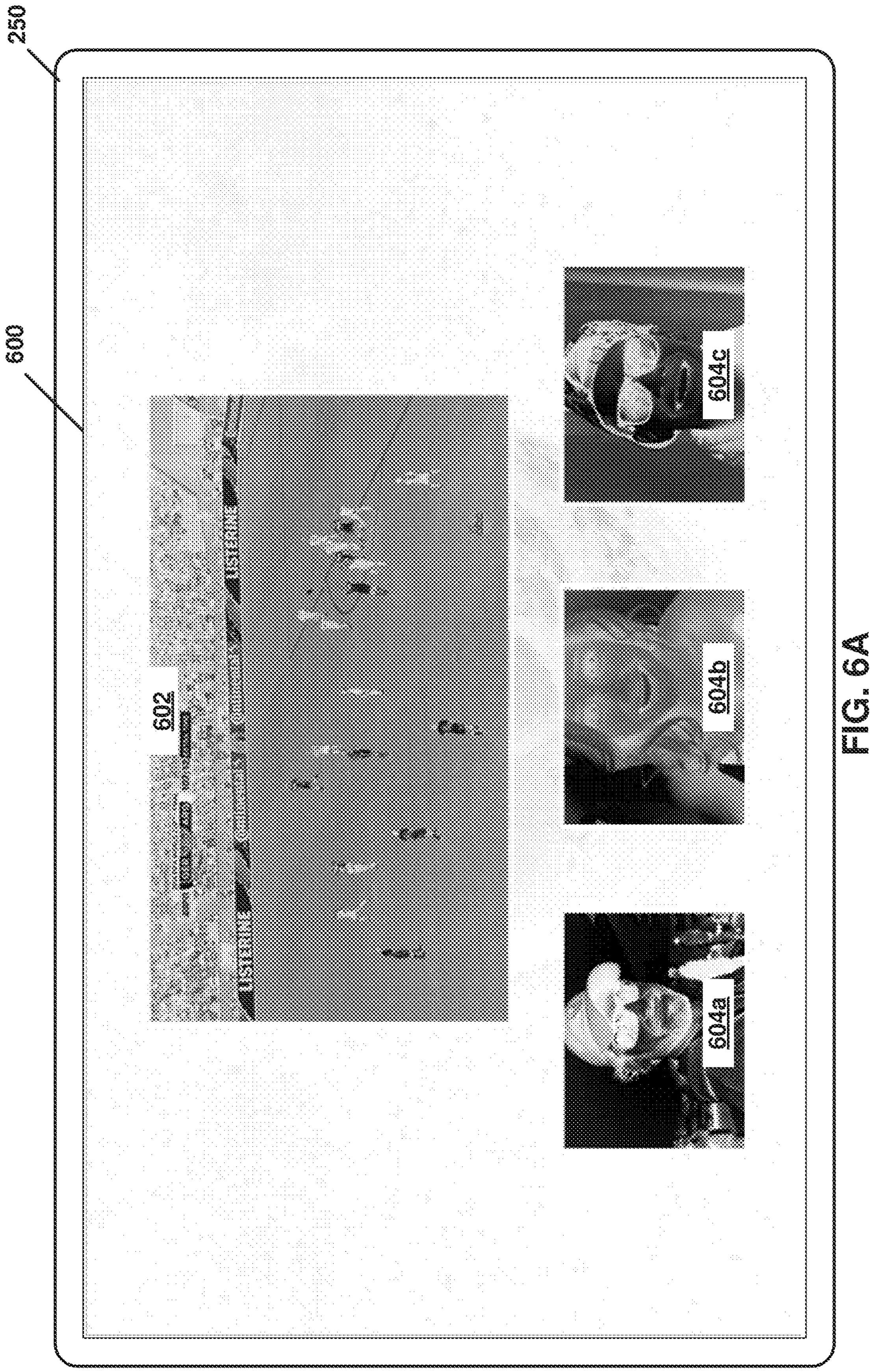
FIGS. 6A-6C are a conceptual diagrams illustrating an example of a graphical user interface in accordance with one or more techniques of this disclosure.
Figure 6B:
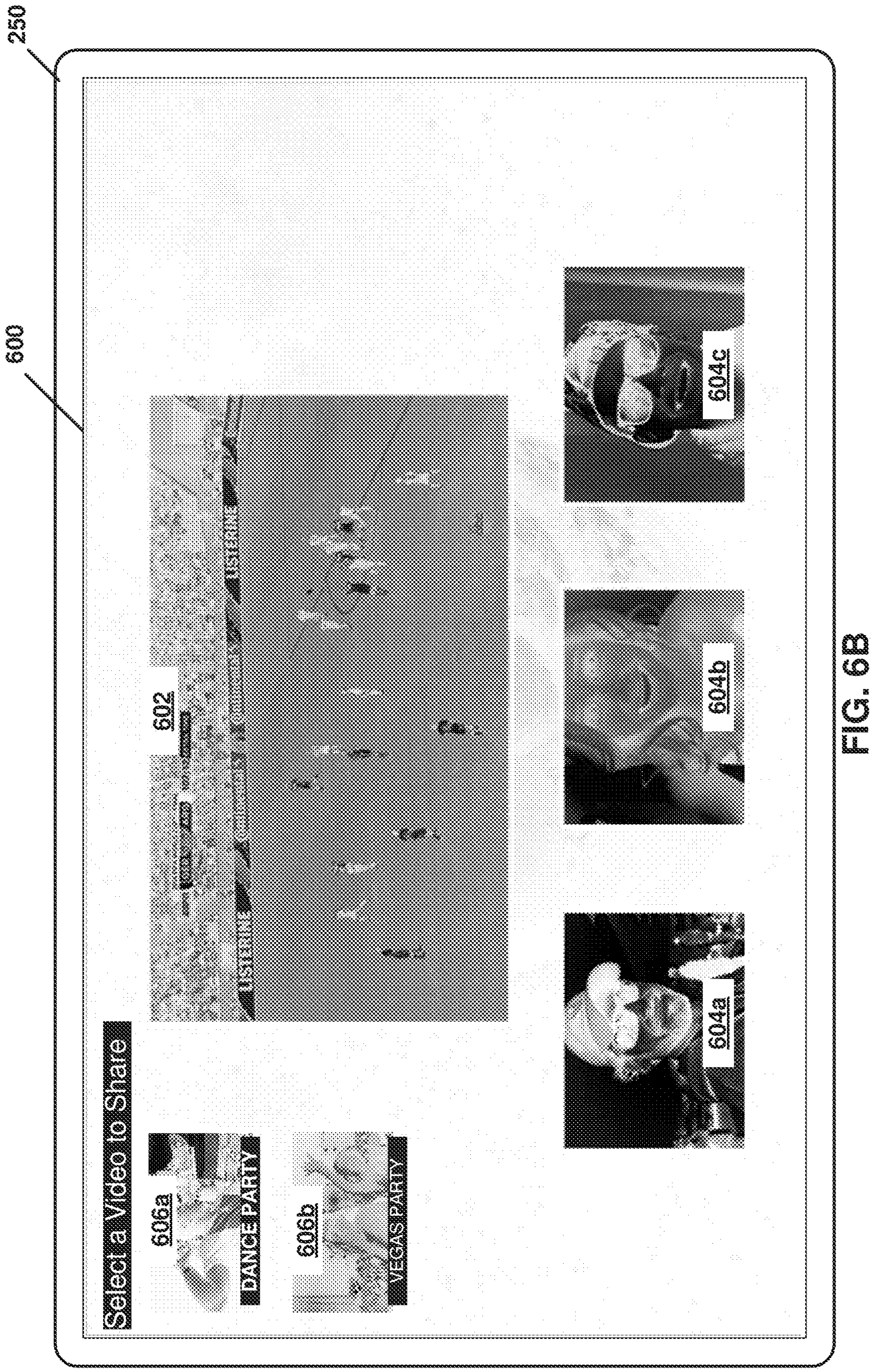
Figure 6C:
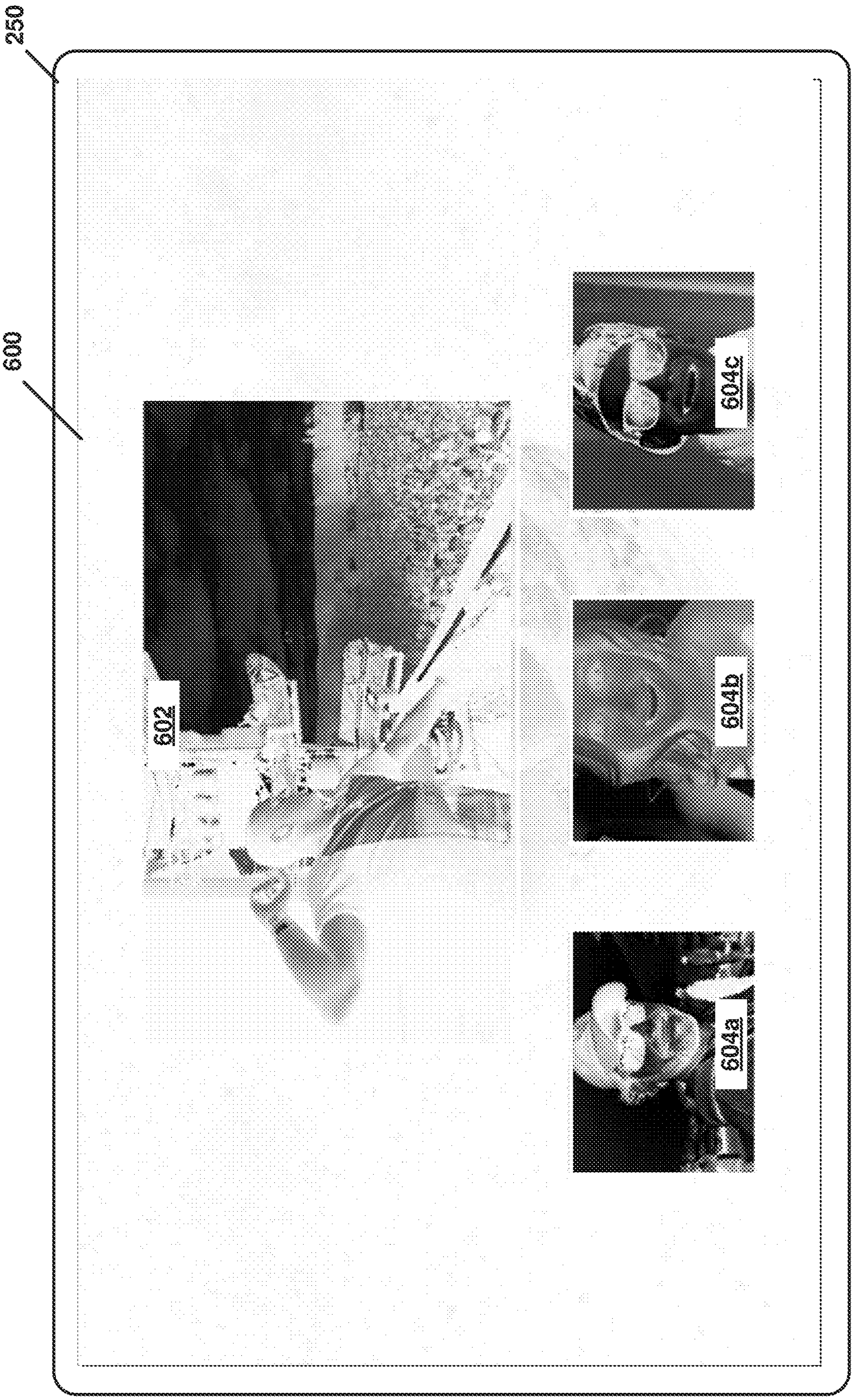

An example of a graphical user interface presenting a viewing party is illustrated in FIGS. 6A-6C. A viewing party may enable a user to access content while communicating with other users accessing the same content. As illustrated in FIGS. 6A-6C, viewing party graphical user interface 600 includes video chat windows 604*a*-604*c* associated with each of the user's friends and a playback window 602 associated with the content each of the user's is accessing (e.g., the live sporting event). Video chat windows 604*a*-604*c* may include video provided by another user (e.g., through a video camera). As illustrated in FIGS. 6A-6C, playback window 602 and video chat windows 604*b* may be displayed in parallel so that a user may experience both simultaneously. In one example, audio from each of the video sources may playback simultaneous, similar to an actual viewing experience. In one example, computing device 200 may be configured such that when a user makes a comment via a video chat, the audio of the item of content included in playback window 602 is lowered until the conversation has ended. Further, once a detection is made that the audio signal from the video chat has paused, the audio for the content including in playback window 602 may resume to normal settings.

In the example illustrated in FIGS. 6A-6C, a user (e.g., the user who initiated the viewing party) may control the content displayed in playback window 602. For example, if a viewer's team scores a goal, a user may cause a celebration video to be displayed in the respective video playback windows of the other users. In one example, a user may initiate selection a celebration video by activating share button 296 or by performing an equivalent action (e.g., saying "share" or activating a region of a touchscreen display). In one example, upon a user activating share button 296, a graphical user interface enabling a user to select a video may be displayed. FIG. 6B illustrates an example where graphical user interface 600 displays windows 606*a*-606*b*, where each of windows 606*a*-606*b* are associated with a video that a user may share. A user may select one of 606*a* or 606*b* using navigational arrows 281 and a select button 282, or the like.

FIG. 6C illustrates an example where a selected celebration video (i.e., Dance Party) is displayed in playback window 602. In one example, a separate window may appear in graphical user interface 600 to play the celebration video and may disappear at the conclusion of the celebration video. For example, a second playback window may appear to the right or to the left of the video playback window 602 displaying the live sporting event. It should be noted that a computing device may display any and all combinations of the graphical user interfaces illustrated in FIGS. 3A-6C the example descriptions of how graphical user interfaces may be presented to a user are for illustrative purposes.

Figure 7:
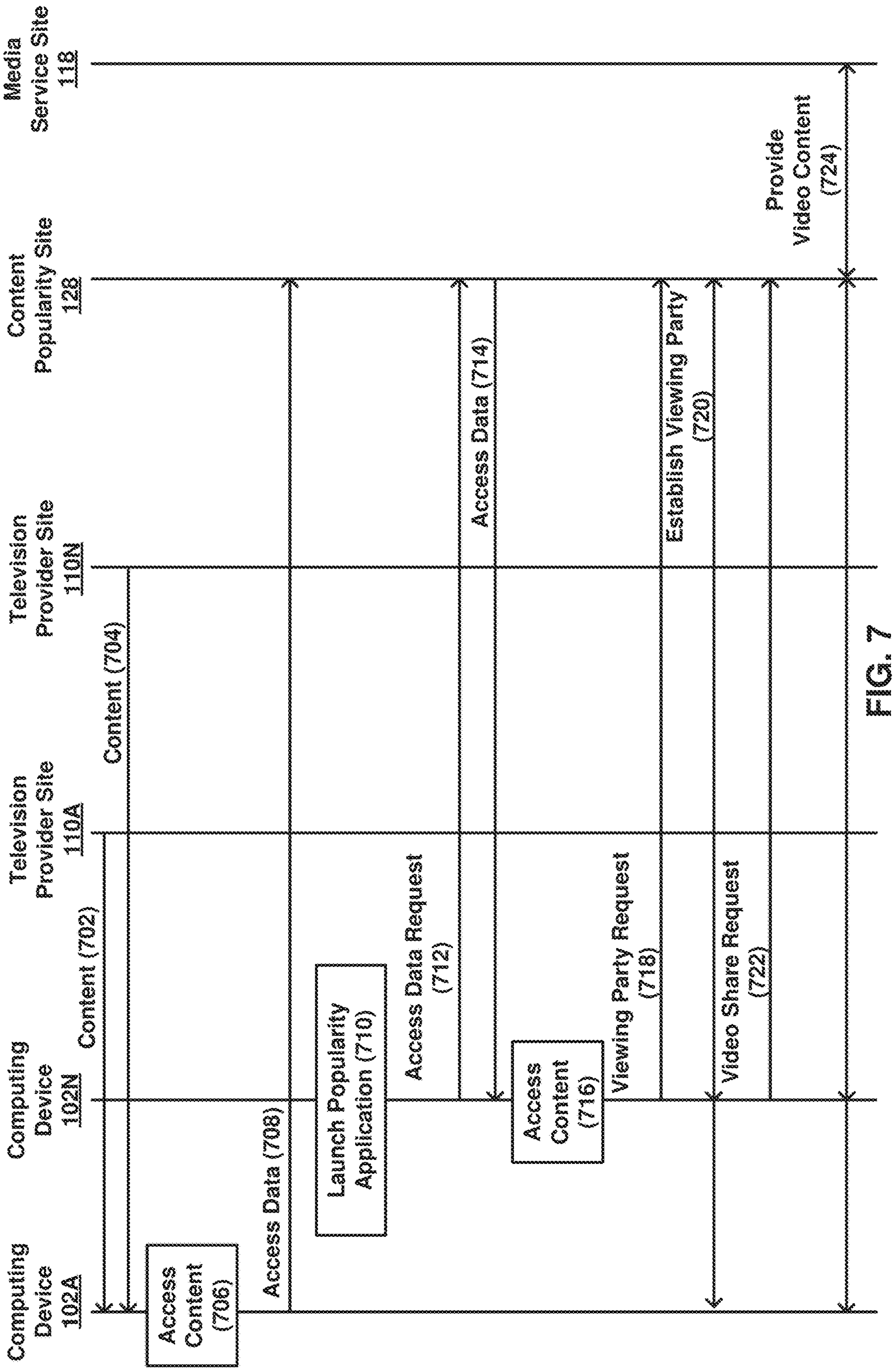
FIG. 7 is a conceptual communications flow diagram illustrating an example of enabling a user to engage in a remote joint viewing experience according to one or more techniques of this disclosure.

As described above, a user and a user's friends may have different television services providers (a United States regional cable provider and European satellite television service provider). The techniques described herein may enable users having different television service or other media service provides to engage in a joint viewing experience (e.g., engage in a viewing party). FIG. 7 is a conceptual communications flow diagram illustrating an example method for enabling a user to engage in a remote joint viewing experience according to one or more of the techniques of this disclosure. It should be noted that the example illustrated in FIG. 7 is described with respect an example use case scenario for illustration purposes. However, the techniques described herein are more generally applicable to other user case scenarios (e.g., any user may request a viewing party).

As illustrated in FIG. 7, computing device 102A receives content from television provider site 110A (702). Computing device 102N receives content from television provide site 110B (704). Television provider sites 110A and 110B may include any of the example television provider sites described herein. Content may include any of the types of content described herein. Computing device 102A accesses an item of content (706). For example, a user of computing device 102A may cause a tuner to tune to a digital television channel. Computing device 102A transmits access data to content popularity site 128 (708). In one example, access data may include user viewing data. Access data may be transmitted using any and all combinations of the communications networks described above. Access data may include information identifying an item of content that computing device 102A is accessing (e.g., a title of a television program, identifying metadata, etc.) At 710, computing device 102N launches a popularity application. A popularity application may include popularity application 209 described above. As described above, in one example a user may cause a popularity application to be launch by activating buzz button 292 of globe button 294. Upon a popularity application being launched, computing device 102N requests access data from content popularity site 128 (712) and content popularity site 128 provides access data to computing device 102N. In the example illustrated in FIG. 7, access data includes access data associated with computing device 102A. In this manner, computing device 102N may be able to generate a graphical user interface (e.g., graphical user interface 500) based on regionally popular and/or based on what members of a user's social circle are accessing.

In the example illustrated in FIG. 7, computing device 102N accesses content associated with access data (716). For example, upon seeing an item of content that user of computing device 102A is currently accessing, user of computing device 102N may cause computing device 102N to tune to a digital television channel presenting the item of content. An example graphical user interface illustrating 102N accessing an item of content associated with access data is illustrated in FIG. 5G. As illustrated in FIG. 7, upon computing device 102N accessing content that computing device 102A is accessing, computing device 102N may send a viewing party request to content popularity site 128 (718). For example, a user of computing device 102N may activate select button 282 when the example graphical user interface illustrated in FIG. 5G is displayed. As illustrated in FIG. 7, each of computing device 102A, computing device 102N, and content popularity site 128 may facilitate the establishment of a viewing party (720). Establishing a viewing party may include establishing a video chat and presenting a corresponding graphical user interface. Establishing a video chat may include establishing a video chat using so-called IP telephony, Internet telephony, broadband telephony, or the like and may include a combination of peer-to-peer and client-server communications.

As illustrated in FIG. 7, upon viewing party being established computing device 102N may send a video share request to content popularity site 128. For example, a user may select a video as described with respect to FIG. 6B above. In the example illustrated in FIG. 7, the video is located at media service provider site 118. In this example, computing device 102N may provide a Universal Resource Locator (URL), or the like, which provides access to a video, to content popularity site 128. As illustrated in FIG. 7, computing device 102A and computing device 102N may access video content from content popularity site 128 and/or media service site 118 (724). It should be noted that in one example, computing device 102A and computing device 102N may share video content using a combination of peer-to-peer and client-server communications. In this manner, computing device 200 represents an example of computing device configured to display a graphical user interface including a map including identifiers of users at respective locations, enable a user to navigate to a particular identifier, and upon a user navigating to a particular identifier, display a window associated with an item of content.

As described herein, in one example, a method for enabling content selection comprises displaying a graphical user interface including a map including identifiers of users at respective locations, enabling a user to navigate to a particular identifier, and upon a user navigating to a particular identifier, displaying a window associated with an item of content. In one example, displaying the graphical user interface including a map includes displaying a globe including markers at locations on the globe. In one example, enabling a user to navigate to a particular identifier includes enabling a user to cause the globe to be rotated. In one example, enabling a user to navigate to a particular identifier includes enabling user to cause a zoom to occur. In one example, displaying a window associated with an item of content includes displaying one of: an item of content in progress, a preview associated with an item of content, or an image associated with an item of content. In one example, a window associated with an item of content includes identifiers of additional users accessing the content. In one example, the method further comprises enabling a user to cause a viewing party to be initiated by selecting the window. In one example, initiating a viewing party causes a graphical user interface including a playback window presenting a video associated with the item of content and one or more windows associated with other users accessing the content to be displayed. In one example, a viewing party enables a user to engage in a video chat with one or more other users while accessing an item of content. In one example, during a viewing party a user may cause additional video content to be displayed.

As described herein, in one example, an apparatus enabling content selection, comprises means for displaying a graphical user interface including a map including identifiers of users at respective locations, means for enabling a user to navigate to a particular identifier, and means displaying an item of content associated with a particular identifier. In one example, users include friends defined according to one or more social networks. In one example, identifiers of users include a respective visual identifier associated with a user. In one example, the apparatus further comprises means for enabling a user to engage in a video chat with a user associated with an identifier, upon the user navigating to a particular identifier. In one example, means for enabling a user to engage in a video chat further includes means for enabling a user to engage in a video while simultaneously accessing an item of content. In one example, means for enabling a user to engage in a video chat while simultaneously accessing an item of content includes means for lowering a volume of audio associated with the item of content based on the video chat.

As described herein, in one example, a device for enabling content selection comprises one or more processors configured to receive user viewing data associated with an item of content a user is accessing at a first computing device, receive a request for the received access data from a second computing device, provide the received access data to the second computing device, and upon receiving a request from the second computing device, facilitate the establishment of a video chat between the user of the first computing and the user of the second computing device. In one example, viewing data includes a title of a television program. In one example, the one or more processors are further configured to provide one or more ranking values to the second computing device. In one example, the one or more ranking values include one or more of: an on demand requests value, a media service requests value, a rentals value, a social media value, and a search requests value.

The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, which is generated to encode information for transmission to suitable receiver apparatus.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a mark-up language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. A computerized method to display shared content, comprising:

generating an interactive interface comprising a geographical map including a plurality of identifiers, each identifier of the plurality of identifiers being interactive and displayed at a respective position on the geographical map based on a geographical location of one or more social network friends, wherein the interactive interface enables a first user to navigate to one or more of the plurality of identifiers, and wherein a first identifier of the plurality of identifiers is associated with a second user;

responsive to a first interaction by the first user that is with the first identifier, causing display, by a computing device, at a display device, of a first window overlaid on the geographical map based on the position of the first identifier on the geographical map, the first window providing a view displaying a first media item as presented in progress to the second user, wherein the interactive interface includes a first interactive element that is interactive to allow the first user to join the viewed media item in progress by the second user;

in response to a second interaction that is with the first interactive element included in the interactive interface, initiating, by the computing device, a first video chat between the first user and at least the second user, the initiating of the first video chat including causing display, at the display device, of a second window and a second interactive element to present a second media item, wherein the second window, upon display, is interactive to enable the first video chat between the first user and at least the second user;

in response to detecting an audio signal from the first video chat enabled in the second window, adjusting, by the computing device, one or more settings controlling a volume of audio of the first media item that is presented in progress; and in response to detecting a change corresponding to a pause in the audio signal from the first video chat, adjusting, by the computing device, the volume of the audio of the first media item from the one or more adjusted settings to one or more previous settings of the volume of the audio.

2. The method of claim 1, wherein the first identifier comprises a visual identifier that identifies the second user to the first user.

3. The method of claim 1, wherein the adjusting the one or more settings controlling a volume of audio comprises lowering the volume of audio of the first media item that is presented in progress.

4. The method of claim 1, further comprising causing display, by the computing device, at the display device, in the interactive interface, of a title of the second media item.

5. The method of claim 4, wherein the second media item is a television program.

6. An apparatus comprising:

one or more processors; and a machine-readable medium storing instructions that, when executed by the one or more processors, cause the apparatus to perform operations comprising:

generating an interactive interface comprising a geographical map including a plurality of identifiers, each identifier of the plurality of identifiers being interactive and displayed at a respective position on the geographical map based on a geographical location of one or more social network friends, wherein the interactive interface enables a first user to navigate to one or more of the plurality of identifiers, and wherein a first identifier of the plurality of identifiers is associated with a second user;

responsive to a first interaction by the first user that is with the first identifier, causing display in the interactive interface, by a computing device, at a display device, of a first window overlaid on the geographical map based on the position of the first identifier on the geographical map, the first window providing a view displaying a first media item as presented in progress to the second user, wherein the interactive interface includes a first interactive element that is interactive to allow the first user to join the viewed media item in progress by the second user;

in response to a second interaction that is with the first interactive element included in the interactive interface, initiating, by the computing device, a first video chat between the first user and at least the second user, the initiating of the first video chat including causing display, at the display device, of a second window and a second interactive element to present a second media item, wherein the second window, upon display, is interactive to enable the first video chat between the first user and at least the second user;

in response to detecting an audio signal from the first video chat enabled in the second window, adjusting, by the computing device, one or more settings controlling a volume of audio of the first media item that is presented in progress; and in response to detecting a change corresponding to a pause in the audio signal from the first video chat, adjusting, by the computing device, the volume of the audio of the first media item from the one or more adjusted settings to one or more previous settings of the volume of the audio.

7. The apparatus of claim 6, wherein the first identifier comprises a visual identifier that identifies the second user to the first user.

8. The apparatus of claim 6, wherein the adjusting the one or more settings controlling a volume of audio comprises lowering the volume of audio of the first media item that is presented in progress.

9. The apparatus of claim 6, further comprising causing display, by the computing device, at the display device, in the interactive interface, of a title of the second media item.

10. The apparatus of claim 6, wherein the second media item is a television program.

11. A non-transitory machine-readable storage medium comprising instructions that, when executed by one or more processors of a machine, cause the machine to perform operations comprising:

generating an interactive interface comprising a geographical map including a plurality of identifiers, each identifier of the plurality of identifiers being interactive and displayed at a respective position on the geographical map based on a geographical location of one or more social network friends, wherein the interactive interface enables a first user to navigate to one or more of the plurality of identifiers, and wherein a first identifier of the plurality of identifiers is associated with a second user;

responsive to a first interaction by the first user that is with the first identifier, causing display in the interactive interface, by a computing device, at a display device, of a first window overlaid on the geographical map based on the position of the first identifier on the geographical map, the first window providing a view displaying a first media item as presented in progress to the second user, wherein the interactive interface includes a first interactive element that is interactive to allow the first user to join the viewed media item in progress by the second user;

in response to a second interaction that is with the first interactive element included in the interactive interface, initiating, by the computing device, a first video chat between the first user and at least the second user, the initiating of the first video chat including causing display, at the display device, of a second window and a second interactive element to present a second media item, wherein the second window, upon display, is interactive to enable the first video chat between the first user and at least the second user;

in response to detecting an audio signal from the first video chat enabled in the second window, adjusting, by the computing device, one or more settings controlling a volume of audio of the first media item that is presented in progress; and in response to detecting a change corresponding to a pause in the audio signal from the first video chat, adjusting, by the computing device, the volume of the audio of the first media item from the one or more adjusted settings to one or more previous settings of the volume of the audio.

12. The non-transitory machine-readable storage medium of claim 11, wherein the first identifier comprises a visual identifier that identifies the second user to the first user.

13. The non-transitory machine-readable storage medium of claim 11, wherein the adjusting the one or more settings controlling a volume of audio comprises lowering the volume of audio of the first media item that is presented in progress.

14. The non-transitory machine-readable storage medium of claim 11, further comprising causing display, by the computing device, at the display device, in the interactive interface, of a title of the second media item.

15. The non-transitory machine-readable storage medium of claim 11, wherein the second media item is a television program.

* * * * *